(12) United States Patent
Matsuhisa et al.

(10) Patent No.: US 12,310,447 B2
(45) Date of Patent: May 27, 2025

(54) FOOTWEAR

(71) Applicant: ASICS CORPORATION, Kobe (JP)

(72) Inventors: Yuka Matsuhisa, Kobe (JP); Seiji Yano, Kobe (JP); Kenji Hirata, Kobe (JP); Genki Hatano, Kobe (JP)

(73) Assignee: ASICS CORPORATION, Kobe (JP)

( * ) Notice: Subject to any disclaimer, the term of this patent is extended or adjusted under 35 U.S.C. 154(b) by 0 days.

(21) Appl. No.: 18/379,483

(22) Filed: Oct. 12, 2023

(65) Prior Publication Data
US 2024/0122297 A1    Apr. 18, 2024

(30) Foreign Application Priority Data

Oct. 14, 2022   (JP) ................................ 2022-165740
Jul. 24, 2023   (JP) ................................ 2023-120130

(51) Int. Cl.
*A43B 13/18*     (2006.01)
*A43B 3/12*      (2006.01)
(Continued)

(52) U.S. Cl.
CPC ............ *A43B 13/186* (2013.01); *A43B 3/128* (2013.01); *A43B 13/04* (2013.01); *B33Y 80/00* (2014.12)

(58) Field of Classification Search
CPC ....... A43B 13/186; A43B 3/128; A43B 13/04; A43B 17/026; A43B 17/14; B33Y 80/00
(Continued)

(56) References Cited

U.S. PATENT DOCUMENTS 3,722,113 A * 3/1973 Birkenstock ........... A43B 7/142
                                                        36/43
3,885,555 A * 5/1975 Nobbs .................... A43B 7/146
                                                        601/28
(Continued)

FOREIGN PATENT DOCUMENTS

JP    2018187363 A    11/2018

OTHER PUBLICATIONS

European Search Report issued Feb. 16, 2024 in corresponding European Application No. 23202453.9.
(Continued)

*Primary Examiner* — Timothy K Trieu
(74) *Attorney, Agent, or Firm* — Global IP Counselors, LLP

(57) ABSTRACT

Footwear includes a footbed portion including a support region. The support region includes an upper surface-side projection portion forming region having a plurality of upper surface-side projection portions. A maximum outer dimension in a cross-section orthogonal to a projecting direction of each of the plurality of upper surface-side projection portions is not greater than 3.0 mm. A projection length of each of the plurality of upper surface-side projection portions is not less than 4.0 mm and not greater than 13.0 mm, and an arrangement density of the plurality of upper surface-side projection portions in the upper surface-side projection portion forming region is not less than 10% and not greater than 100% in terms of an area ratio. An elastic modulus of a material forming the plurality of upper surface-side projection portions is not less than 0.1 MPa and not greater than 100 MPa.

15 Claims, 17 Drawing Sheets

(51) Int. Cl.
*A43B 13/04* (2006.01)
*B33Y 80/00* (2015.01)

(58) Field of Classification Search
USPC .............................................. 36/28
See application file for complete search history.

(56) References Cited

U.S. PATENT DOCUMENTS

| | | | | |
|---|---|---|---|---|
| 4,345,387 | A * | 8/1982 | Daswick | A43B 13/14 |
| | | | | 36/43 |
| D373,013 | S * | 8/1996 | Rosetta | D2/961 |
| 9,192,205 | B2 * | 11/2015 | McDowell | A43B 5/08 |
| 10,149,512 | B1 * | 12/2018 | Wurtz | A43B 7/143 |
| 10,149,514 | B2 * | 12/2018 | Adams | A43C 11/14 |
| 10,244,818 | B2 * | 4/2019 | DesJardins | A43B 13/20 |
| 10,687,584 | B2 * | 6/2020 | Austin | A43B 13/14 |
| 2006/0026865 | A1 | 2/2006 | Grisoni et al. | |
| 2008/0022561 | A1 * | 1/2008 | Klavano | A43B 7/146 |
| | | | | 36/141 |
| 2016/0235158 | A1 | 8/2016 | DesJardins et al. | |
| 2018/0271213 | A1 | 9/2018 | Perrault et al. | |
| 2019/0090586 | A1 | 3/2019 | Lee | |
| 2019/0116922 | A1 * | 4/2019 | Wurtz | A43B 7/141 |

OTHER PUBLICATIONS

Communication pursuant to Article 94(3) EPC received in European Application No. 23202453.9, issued on Dec. 4, 2024, 7 pages.

* cited by examiner

FOOTWEAR

CROSS REFERENCE TO RELATED APPLICATIONS

This nonprovisional application is based on Japanese Patent Application No. 2022-165740 filed on Oct. 14, 2022 and No. 2023-120130 filed on Jul. 24, 2023, with the Japan Patent Office, the entire contents of which are hereby incorporated by reference.

BACKGROUND

Technical Field

The present disclosure relates to footwear represented by sandals, shoes, and the like.

Background Information

Japanese Patent Laying-Open No. 2018-187363 discloses a footwear sole manufactured by a three-dimensional additive manufacturing method. The sole disclosed in the above-mentioned document is formed of a three-dimensional mesh structure body having a three-dimensional lattice structure as a unit structure.

SUMMARY

It has been determined that in footwear, when there is a large contact area between a footbed portion and a foot of a wearer, friction between the footbed portion and the wearer's foot increases. Therefore, a problem can arise in which the wearer has difficulty sliding the foot along the footbed portion when the wearer puts a foot in the footwear. This problem is particularly notable, for example, in a case where the footwear is manufactured by the three-dimensional additive manufacturing method in which a degree of freedom in material selection is low due to manufacturing restrictions.

Thus, the present disclosure has been made in view of the problems described above, and an object of the present disclosure is to provide footwear capable of improving slippage between the footwear and the wearer's foot.

Footwear according to the present disclosure includes a footbed portion. The footbed portion includes a support region on an upper surface of the footbed portion, the support region supporting a foot sole of a wearer's foot, and the support region includes, in at least a part thereof, an upper surface-side projection portion forming region in which a plurality of upper surface-side projection portions are arranged to stand side by side. A maximum outer dimension in a cross-section orthogonal to a projecting direction of each of the plurality of upper surface-side projection portions is less than or equal to 3.0 mm. In addition, a projection length of each of the plurality of upper surface-side projection portions is greater than or equal to 4.0 mm and less than or equal to 13.0 mm, and an arrangement density of the plurality of upper surface-side projection portions in the upper surface-side projection portion forming region is greater than or equal to 10% and less than or equal to 100% in terms of an area ratio. Furthermore, an elastic modulus of a material constituting the plurality of upper surface-side projection portions is greater than or equal to 0.1 MPa and less than or equal to 100 MPa.

Here, the arrangement density of the plurality of upper surface-side projection portions in the upper surface-side projection portion forming region means a ratio of an area of a root portion of the upper surface-side projection portion occupying per 1 $cm^2$ in the upper surface-side projection portion forming region when viewed from a direction orthogonal to the upper surface-side projection portion forming region.

The above and other objects, features, situations and advantages of this disclosure will become apparent from the following detailed descriptions of this disclosure taken in conjunction with the accompanying drawings.

DETAILED DESCRIPTION

Figure 1:
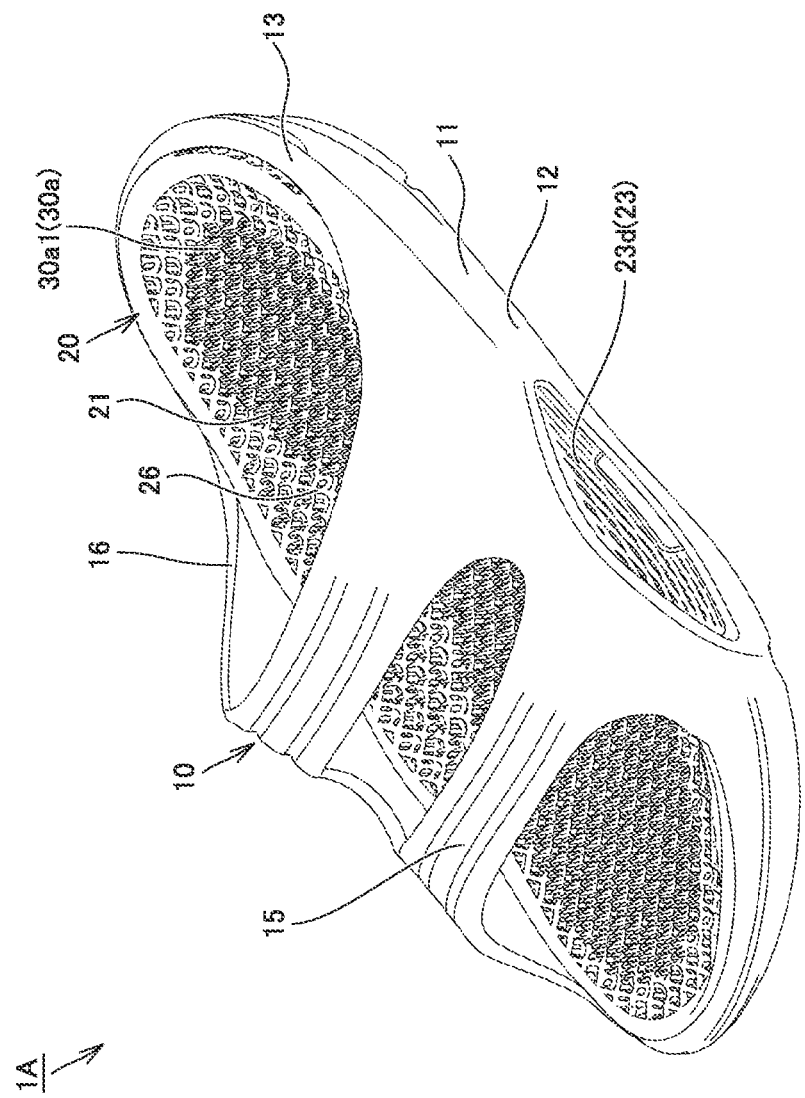
FIG. 1 is a perspective view of footwear according to Embodiment 1.

With reference to the drawings, hereinafter, embodiments of the present disclosure will be described in detail. In the embodiments shown hereinafter, the same or common parts are denoted by the same reference numerals in the drawings, and the descriptions thereof will not be repeated.

Embodiment 1

Figure 2:
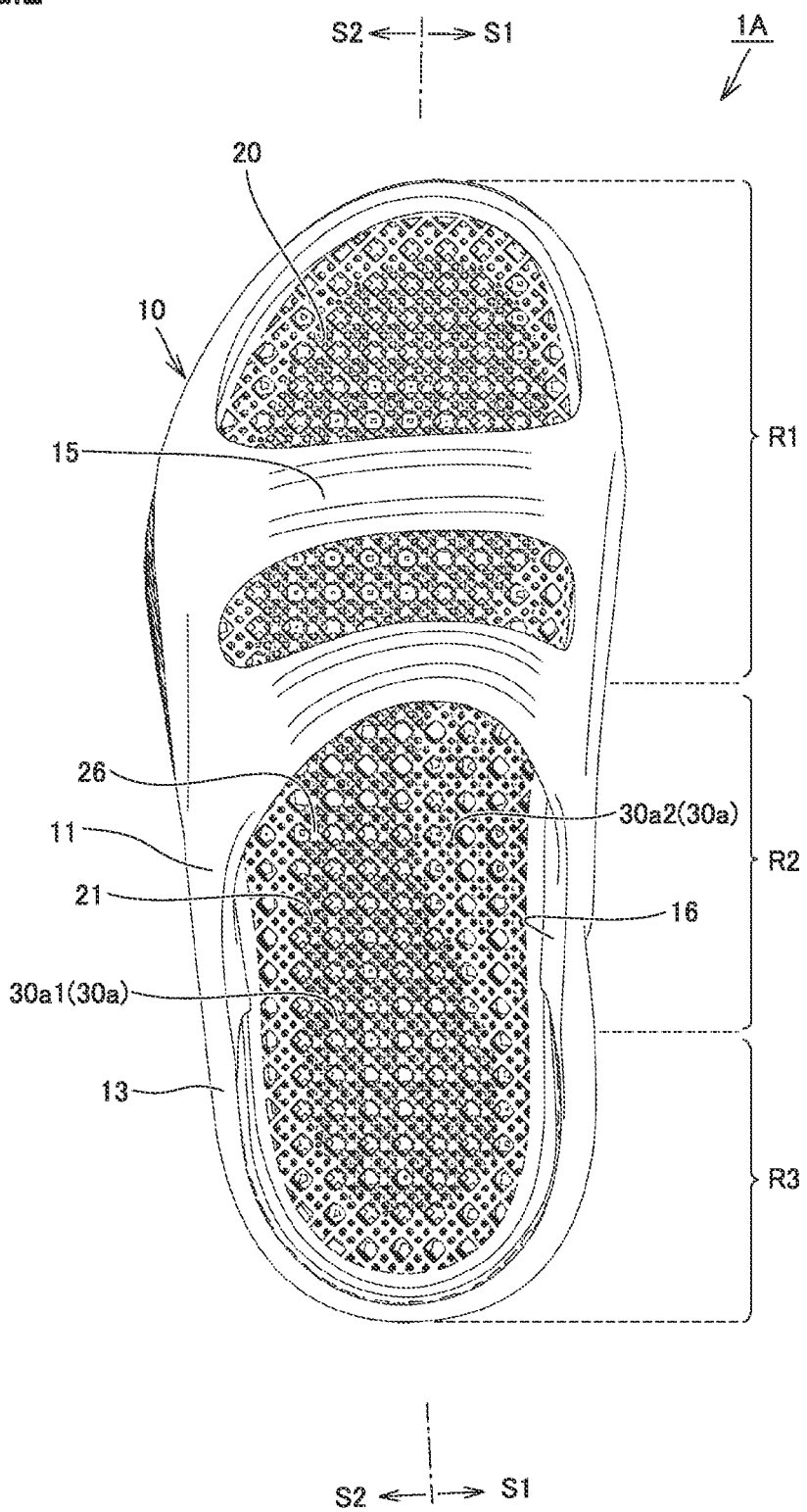
FIG. 2 is a plan view of the footwear shown in FIG. 1.

FIG. 1 is a perspective view of footwear according to Embodiment 1, and FIG. 2 is a plan view of the footwear shown in FIG. 1. With reference to FIG. 1 and FIG. 2, to start with, a schematic configuration of footwear 1A according to the present embodiment will be described.

As shown in FIG. 1 and FIG. 2, the footwear 1A includes a shell 10 and a sole body 20 including a footbed portion 21 that supports the foot sole of the wearer's foot. The footwear 1A is used in an attached state in which the sole body 20 is attached on the shell 10 to be described later, whereby the footbed portion 21 is attached to the shell 10. The footwear 1A according to the present embodiment is a sandal.

When the footwear 1A is worn, a foot sole of the wearer is placed on the upper surface of the sole body 20. Thus, the sole body 20 is sandwiched by the shell 10 and the foot sole of the wearer, so that the sole body 20 supports the wearer's foot.

As shown in FIG. 2, the footwear 1A is divided into a forefoot portion R1, a midfoot portion R2, and a rearfoot portion R3 in a front-rear direction (the up-down direction in FIG. 2) corresponding to a foot length direction of the wearer's foot when seen in a plan view. The forefoot portion R1 supports a toe portion and a ball portion of the wearer's foot, the midfoot portion R2 supports an arch portion of the wearer's foot, and the rearfoot portion R3 supports a heel portion of the wearer's foot.

Here, assuming that a front-side end of the footwear 1A is a reference, a position corresponding to 33.2% of the dimensions in the front-rear direction of the footwear 1A from the front-side end of the footwear 1A is a first boundary position, and a position corresponding to 68.5% of the dimensions in the front-rear direction of the footwear 1A from the front-side end is a second boundary position, the forefoot portion R1 corresponds to a portion included between the front-side end and the first boundary position along the front-rear direction, the midfoot portion R2 corresponds to a portion included between the first boundary position and the second boundary position along the front-rear direction, and the rearfoot portion R3 corresponds to a portion included between the second boundary position and a rear-side end of the footwear 1A along the front-rear direction. Note that the first boundary position extends substantially along an MP joint of the wearer with a standard body shape, and the second boundary position extends substantially along a Chopart joint of the wearer with a standard body shape.

Further, when seen in a plan view, the footwear 1A is divided into a portion on the medial foot side (a portion on the S1 side shown in the figure) and a portion on the lateral foot side (a portion on the S2 side shown in the figure) in a left-right direction corresponding to a foot width direction of the wearer's foot (in the left-right direction in the figure). In this case, the portion on the medial foot side corresponds to the medial side of the foot in anatomical position (i.e., the side close to the midline) and the portion on the lateral foot side is opposite to the medial side of the foot in anatomical position (i.e., the side away from the midline).

The up-down direction of the footwear 1A (described later) means a direction corresponding to a thickness direction (i.e., the up-down direction in FIG. 5) of a base portion 12 (described later) of an outsole portion 11 having a flat shape and also corresponding to a thickness direction of the sole body 20. More specifically, the up-down direction of the footwear 1A is orthogonal both to the front-rear direction corresponding to the above-mentioned foot length direction of the wearer's foot and the left-right direction corresponding to the above-mentioned foot width direction of the wearer's foot.

Figure 3:
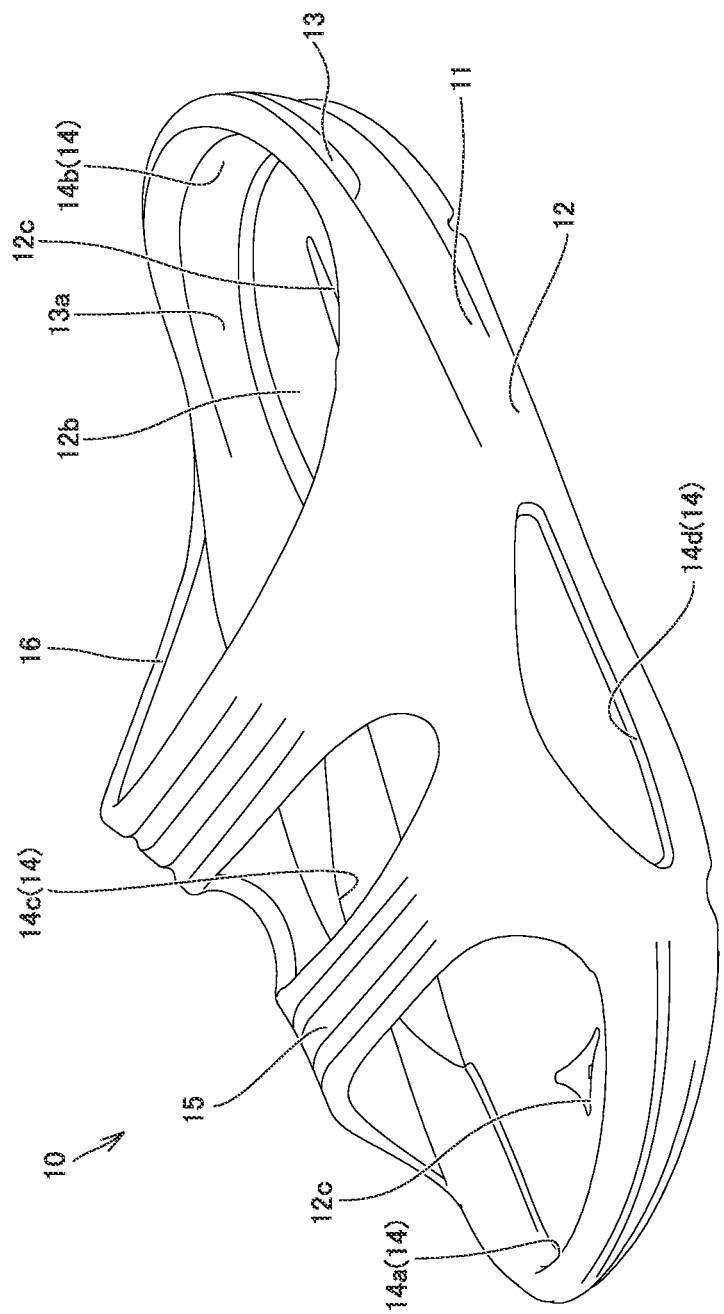
FIG. 3 is a perspective view of a shell shown in FIG. 1.
Figure 4:
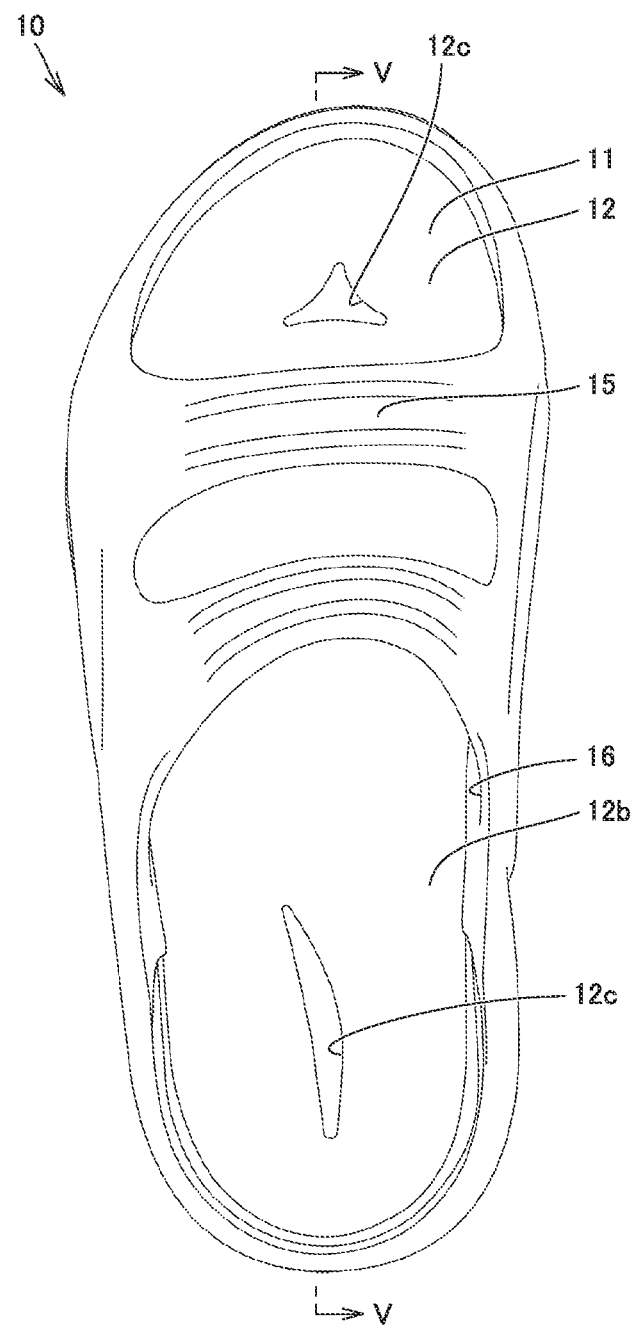
FIG. 4 is a plan view of the shell shown in FIG. 1.
Figure 5:
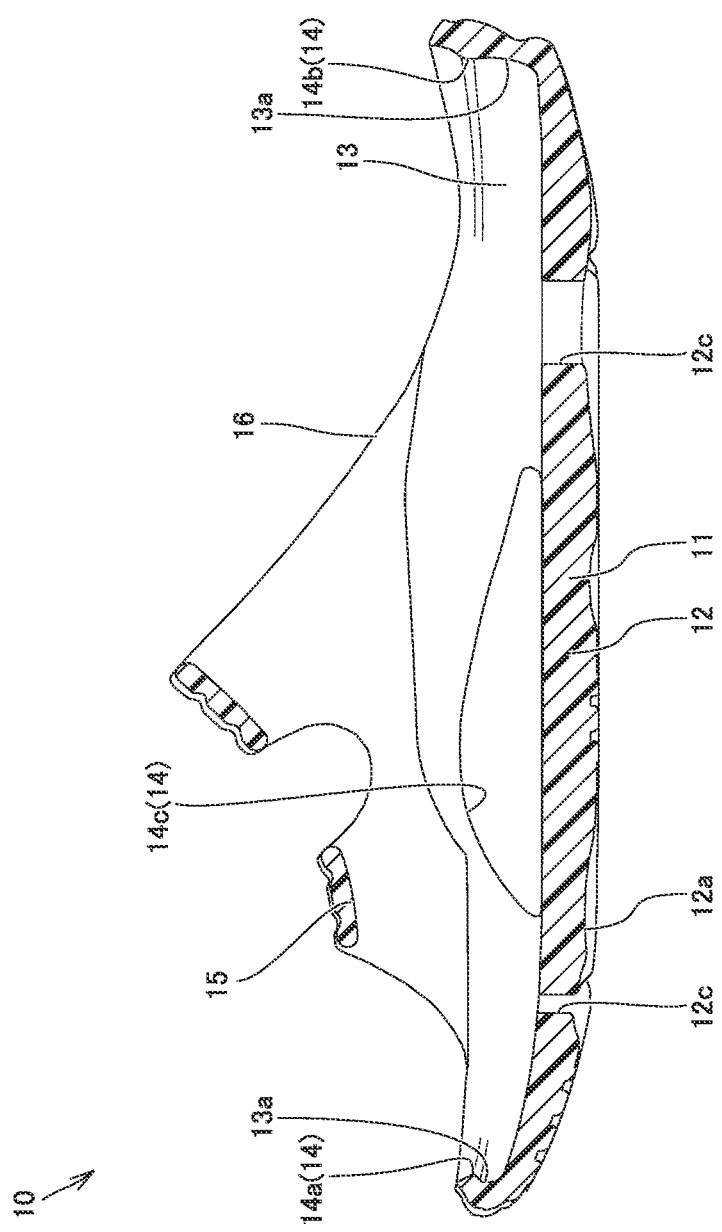
FIG. 5 is a schematic cross-sectional view of the shell shown in FIG. 1 taken along line V-V shown in FIG. 4.

FIG. 3 is a perspective view of the shell shown in FIG. 1, and FIG. 4 is a plan view of the shell shown in FIG. 1. FIG. 5 is a schematic cross-sectional view of the shell taken along line V-V shown in FIG. 4. With reference to FIGS. 3 to 5 and FIGS. 1 and 2 described above, next, a detailed configuration of the shell 10 according to the present embodiment will be described.

As shown in FIGS. 1 to 5, the shell 10 includes the outsole portion 11 including a ground contact surface 12a (see FIG. 5), and a foot cover portion 15 that covers an instep of the wearer's foot.

The outsole portion 11 includes the base portion 12 having a flat shape and a peripheral wall portion 13 extending upward from a peripheral edge of the base portion 12. The lower bottom surface of the base portion 12 defines the ground contact surface 12a that contacts the ground, a floor surface, or the like. An inner side surface 13a of the peripheral wall portion 13 covers a peripheral surface 22 (see FIG. 6 and the like) of the footbed portion 21 of the sole body 20 in the attached state.

The foot cover portion 15 serves to cover the instep of the wearer's foot and is located above the outsole portion 11. In the footwear 1A according to the present embodiment, the foot cover portion 15 has two strap-shaped (i.e., strip-shaped) portions.

The foot cover portion 15 extends in the left-right direction so as to have a substantially mountain-like shape when viewed in the front-rear direction. The foot cover portion 15 has one end connected to a portion located on the medial foot side of the peripheral wall portion 13, and the other end connected to a portion located on the lateral foot side of the peripheral wall portion 13.

Thereby, a topline 16 is formed by a part of the peripheral wall portion 13 that is located rearward of the foot cover portion 15 and the rear end of the foot cover portion 15, and a hollow portion is disposed between the outsole portion 11 and the foot cover portion 15. Thus, by inserting the wearer's foot into the hollow portion through the topline 16 in the state in which the sole body 20 is attached, the footwear 1A can be worn.

The base portion 12 includes a plurality of through holes 12c that extend to a portion defining the ground contact surface 12a and a portion defining the upper bottom surface 12b. The plurality of through holes 12c ensure air permeability when the footwear 1A is worn, which will be described later in detail. In the present embodiment, two through holes 12c are disposed in the base portion 12.

The two through holes 12c are located at positions corresponding to a ball portion and a heel portion of the wearer's foot in a central portion in the foot width direction, where air relatively tends to stay during use of the footwear 1A.

As shown in FIGS. 3 and 5, the inner side surface 13a of the peripheral wall portion 13 of the outsole portion 11 includes a plurality of engaged portions 14. In the present embodiment, a total of four engaged portions 14 are provided that include a front-side engaged portion 14a, a rear-side engaged portion 14b, a medial foot-side engaged portion 14c, and a lateral foot-side engaged portion 14d.

The front-side engaged portion 14a and the rear-side engaged portion 14b are disposed on a front-side portion and a rear-side portion of the outsole portion 11, respectively, and are comprised of projections projecting toward inside of the shell 10 along a direction substantially parallel to the ground contact surface 12a of the outsole portion 11. The front-side engaged portion 14a and the rear-side engaged portion 14b are portions respectively engaged with a front-side engaging portion 23a and a rear-side engaging portion 23b, which will be described later, provided in the sole body 20.

The medial foot-side engaged portion 14c and the lateral foot-side engaged portion 14d are disposed in a medial foot side portion and a lateral foot side portion of the outsole portion 11, respectively, and are comprised of hole portions as removal portions penetrating the peripheral wall portion 13 along a direction substantially parallel to the ground contact surface 12a. The medial foot-side engaged portion 14c and the lateral foot-side engaged portion 14d are portions to be respectively engaged with a medial foot-side engaging portion 23c and a lateral foot-side engaging portion 23d, which will be described later, provided in the sole body 20.

The shell 10 can be basically made of any material as long as it has flexibility, but the material preferably has appropriate strength. From this viewpoint, the shell 10 is preferably made of a resin material or a rubber material. More specifically, when the shell 10 is made of resin, it can be made, for example, of an ethylene-vinyl acetate copolymer (EVA), a polyolefin resin, a polyamide-based thermoplastic elastomer (TPA, TPAE), a thermoplastic polyurethane (TPU), and a polyester-based thermoplastic elastomer (TPEE). On the other hand, when the shell 10 is made of rubber, for example, butadiene rubber (BR) can be used.

The method of manufacturing the shell 10 is not particularly limited, and the shell 10 can be manufactured, for example, by injection molding, cast molding, or molding using a three-dimensional additive manufacturing apparatus.

Figure 6:
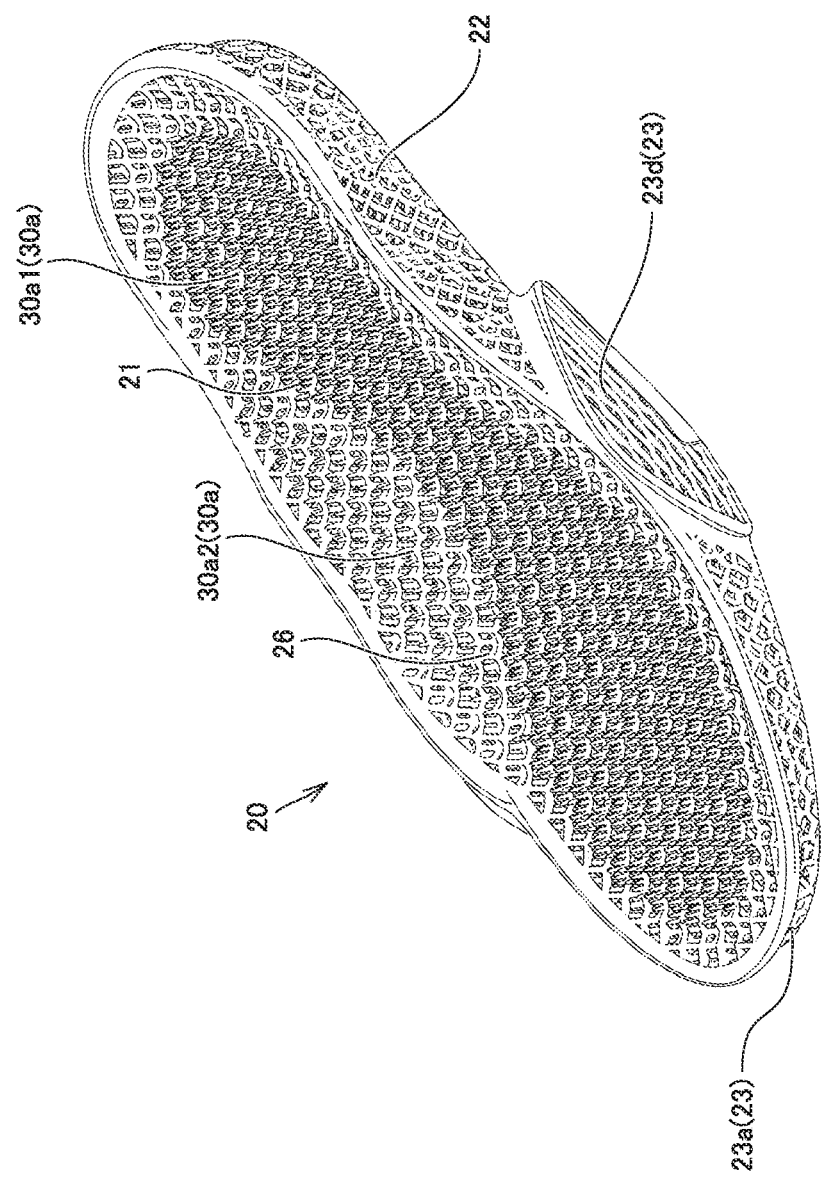
FIG. 6 is a perspective view of a sole body shown in FIG. 1 as viewed obliquely from an upper right front side.
Figure 7:
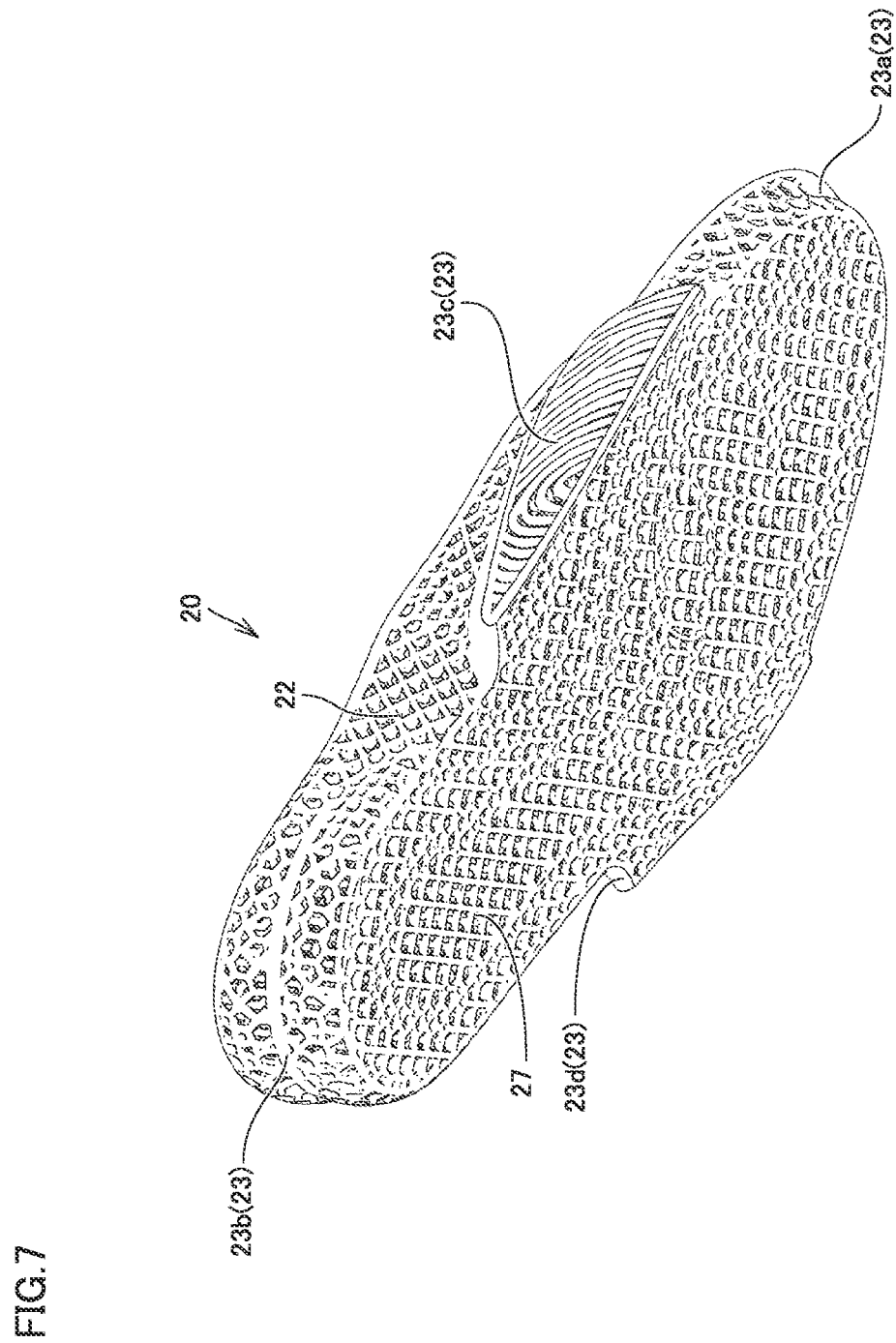
FIG. 7 is a perspective view of the sole body shown in FIG. 1 as viewed obliquely from a lower left rear side.
Figure 8:
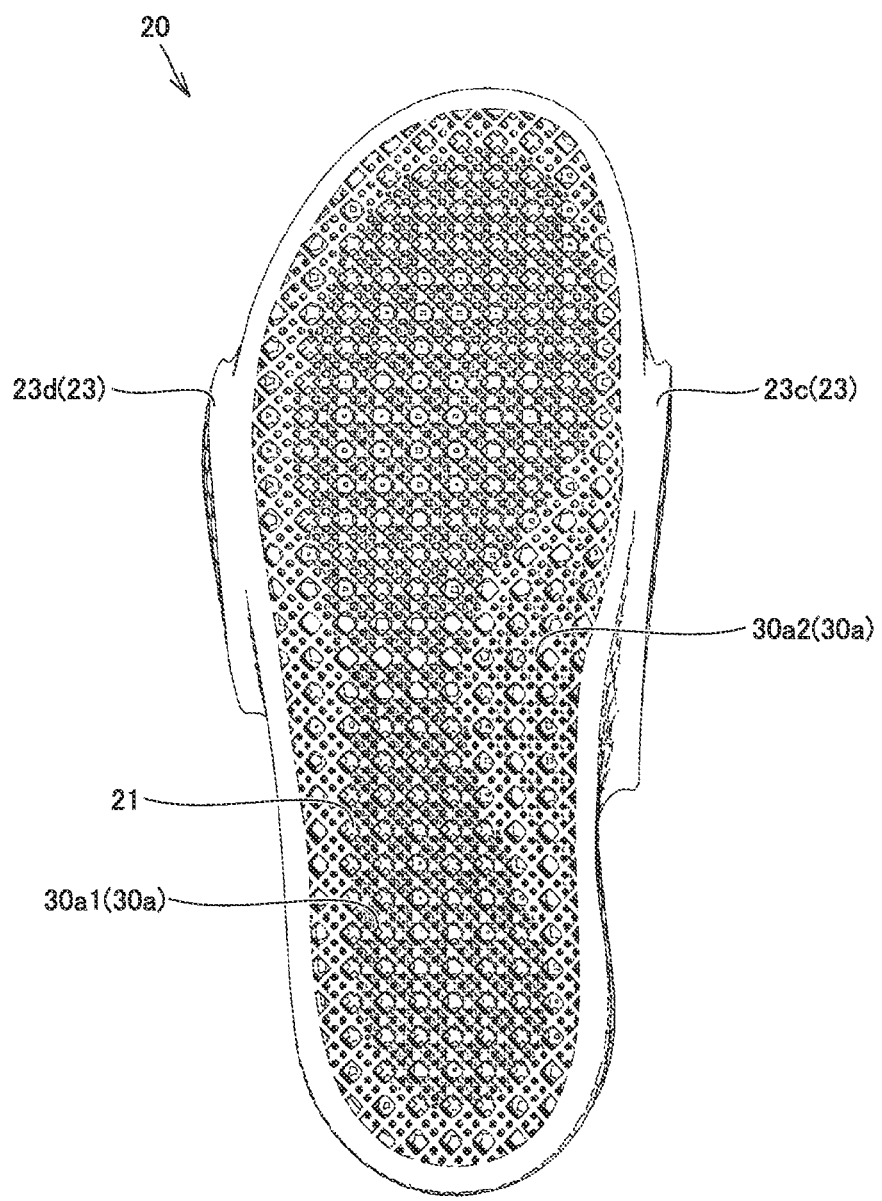
FIG. 8 is a plan view of the sole body shown in FIG. 1.
Figure 9A:
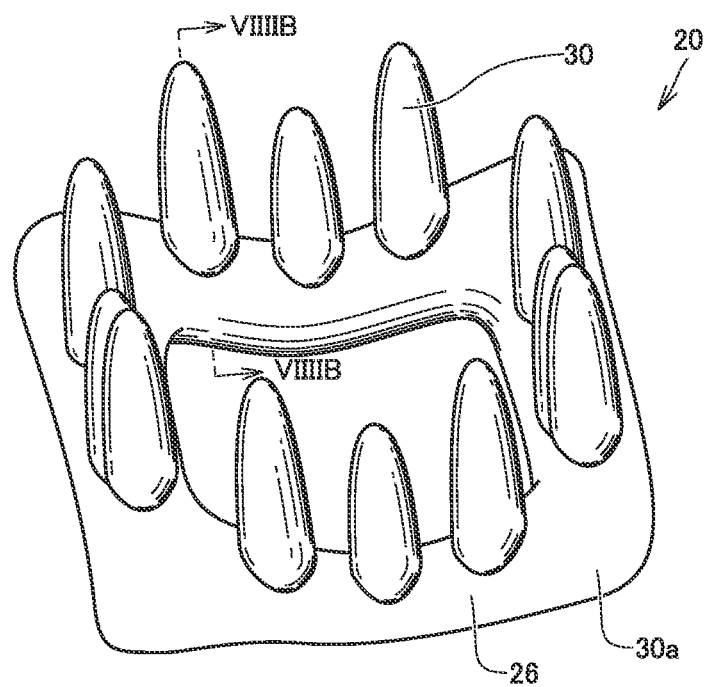
FIG. 9A and FIG. 9B are views for illustrating a shape of an upper surface-side projection portion of the sole body shown in FIG. 6.
Figure 9B:
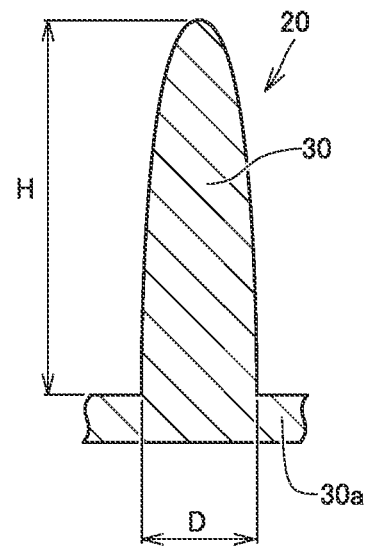
Figure 10:
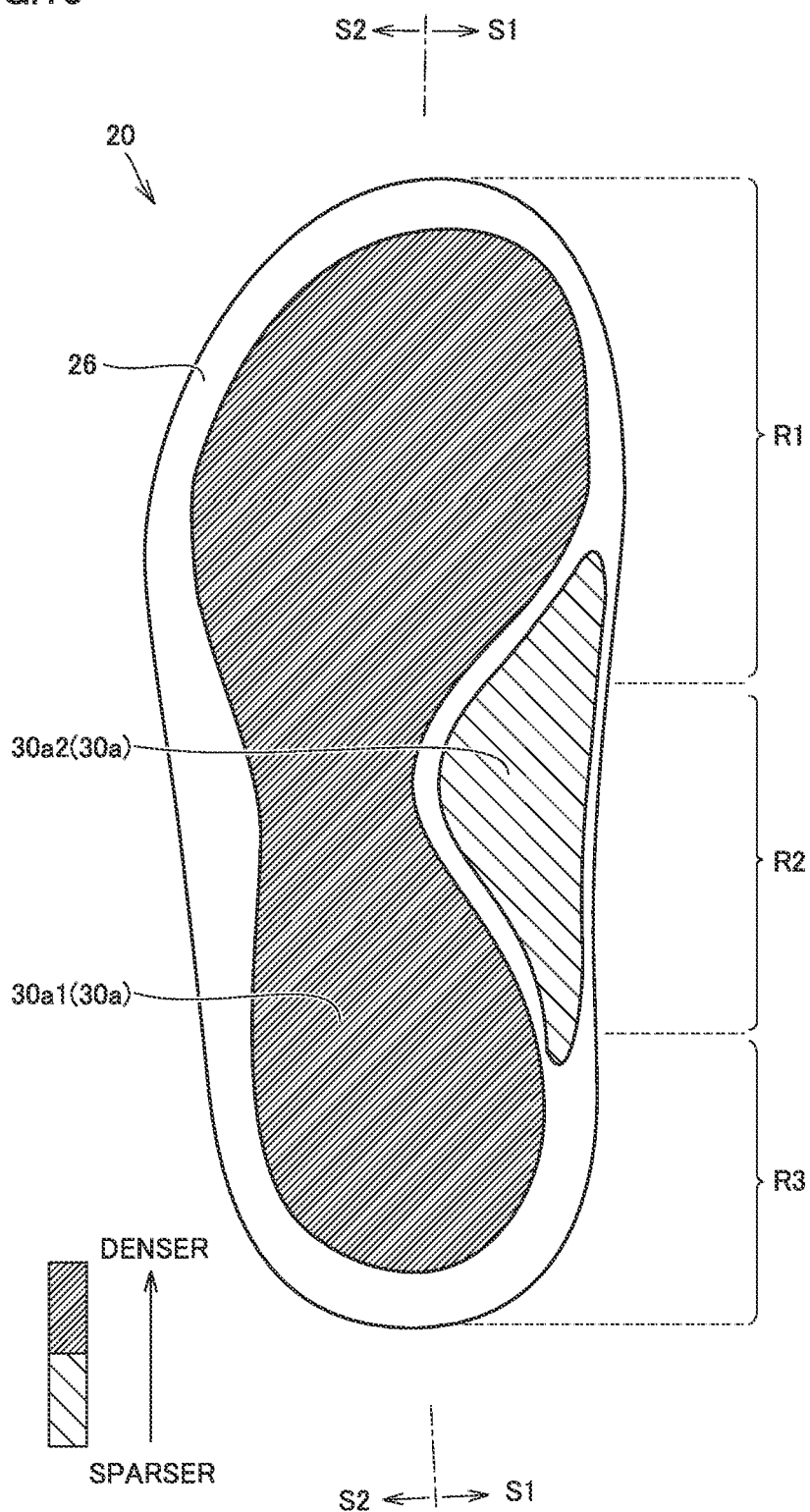
FIG. 10 is a schematic plan view showing a distribution of an upper surface-side projection portion forming region of the sole body shown in FIG. 1.

FIGS. 6 and 7 are perspective views of the sole body shown in FIG. 1 as viewed obliquely from the upper right front side and the lower left rear side, respectively. FIG. 8 is a plan view of the sole body shown in FIG. 1. FIGS. 9A and 9B are views for illustrating the shape of the upper surface-side projection portion of the sole body shown in FIG. 6. FIG. 9A is an enlarged perspective view of a main part in which a part of the upper surface-side projection portion forming region of FIG. 6 is enlarged, and FIG. 9B is a schematic cross-sectional view taken along line VIIIIB-VIIIIB shown in FIG. 9A. FIG. 10 is a schematic plan view showing the distribution of the upper surface-side projection portion forming region of the sole body shown in FIG. 1. With reference to FIGS. 6 to 10 and FIGS. 1 and 2 described above, next, a detailed configuration of the sole body 20 according to the present embodiment will be described.

As shown in FIGS. 1 and 2, and FIGS. 6 to 10, the sole body 20 has a flat shape, and an outer shape of the sole body 20 in a plan view substantially coincides with an outer shape of the space defined by the base portion 12 and the peripheral wall portion 13 of the outsole portion 11. The sole body 20 is formed of a three-dimensional mesh structure body made of a single member and is fabricated by a vat polymerization-type three-dimensional additive manufacturing method.

The sole body 20 is detachably attached to the shell 10 and includes the footbed portion 21 that supports the foot sole of the wearer's foot in the attached state.

The footbed portion 21 has a support region 26 that supports the foot sole of the wearer's foot in the attached state on the upper surface thereof, and a supported region 27 that is supported by the upper bottom surface 12b of the base portion 12 of the shell 10 in the attached state on the lower surface thereof.

The footbed portion 21 has a peripheral edge portion formed to be higher in its thickness direction than the height of the portion of the peripheral wall portion 13 of the outsole portion 11 that corresponds to the peripheral edge portion of the footbed portion 21. Thus, as shown in FIG. 1, in the attached state, the upper end portion of the peripheral edge portion of the footbed portion 21 is located above the upper end portion of the peripheral wall portion 13 of the outsole portion 11, and thereby, the upper end portion of the peripheral surface 22 of the footbed portion 21 is exposed to the outside.

The configuration as described above enables the footwear 1A to have excellent design properties. Further, the peripheral wall portion 13 of the outsole portion 1I has an appropriate strength and extends upwardly. Thus, when the peripheral wall portion 13 contacts the wearer's foot sole, the wearer's foot may be uncomfortable. In this regard, when the upper end portion of the peripheral edge portion of the footbed portion 21 which has flexibility is located above the upper end portion of the peripheral wall portion 13 of the outsole portion 11, direct contact of the wearer's foot sole with the peripheral wall portion 13 can be prevented, with the result that an improved feel of contact for the wearer's foot can be achieved. Note that the upper end portion of the peripheral surface 22 of the footbed portion 21 does not necessarily have to be exposed to the outside in the attached state, but the peripheral surface can be completely covered by the peripheral wall portion 13 of the outsole portion 11.

As shown in FIG. 1, and FIGS. 6 to 8, a plurality of engaging portions 23 are disposed on the peripheral surface 22 of the footbed portion 21. In the present embodiment, a total of four engaging portions 23 including the front-side engaging portion 23a, the rear-side engaging portion 23b, the medial foot-side engaging portion 23c, and the lateral foot-side engaging portion 23d are provided.

The front-side engaging portion 23a and the rear-side engaging portion 23b are disposed in the front-side portion and the rear-side portion of the footbed portion 21, respectively, and are formed of recessed portions as removed portions recessed toward inside of the sole body 20. The front-side engaging portion 23a and the rear-side engaging portion 23b engage with the front-side engaged portion 14a and the rear-side engaged portion 14b are disposed provided in the outsole portion 11, respectively.

The medial foot-side engaging portion 23c and the lateral foot-side engaging portion 23d are disposed at portions on the medial foot side and the lateral foot side of the footbed portion 21, respectively, and are formed of projections projecting toward outside of the sole body 20. The medial foot-side engaging portion 23c and the lateral foot-side engaging portion 23d are engaged with the medial foot-side engaged portion 14c and the lateral foot-side engaged portion 14d disposed in the outsole portion 11, respectively.

As shown in FIG. 6 and FIGS. 8 to 10, the support region 26 of the footbed portion 21 partially includes an upper surface-side projection portion forming region 30a in which a plurality of upper surface-side projection portions 30 are arranged so as to stand side by side. Accordingly, the footwear 1A provides good slippage between the footwear 1A and the wearer's foot, which will be described in detail later.

The material of the sole body 20 is not particularly limited but is preferably a resin material or a rubber material so as to allow additive manufacturing by a vat polymerization-type three-dimensional additive manufacturing method and so as to allow the additively manufactured sole body 20 to have appropriate flexibility, elongation, durability, elasticity, stability, and the like. More specifically, when the sole body 20 is made of resin, examples of resin can be a polyolefin resin, ethylene-vinyl acetate copolymer (EVA), polyamide-based thermoplastic elastomer (TPA, TPAE), thermoplastic polyurethane (TPU), or polyester-based thermoplastic elastomer (TPEE). On the other hand, when the sole body 20 is made of rubber, for example, butadiene rubber (BR) can be used.

The sole body 20 can also be formed of a polymer composition. Examples of polymer to be contained in the polymer composition include olefinic polymers such as olefinic elastomers and olefinic resins. Examples of the olefinic polymers include polyolefins such as polyethylene (e.g., linear low density polyethylene (LLDPE), high density polyethylene (HDPE), and the like), polypropylene, ethylene-propylene copolymer, propylene-1-hexene copolymer, propylene-4-methyl-1-pentene copolymer, propylene-1-butene copolymer, ethylene-1-hexene copolymer, ethylene-4-methyl-pentene copolymer, ethylene-1-butene copolymer, 1-butene-1-hexene copolymer, 1-butene-4-methyl-pentene, ethylene-methacrylic acid copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, propylene-methacrylic acid copolymer, propylene-methyl methacrylate copolymer, propylene-ethyl methacrylate copolymer, propylene-butyl methacrylate copolymer, propylene-methyl acrylate copolymer, propylene-ethyl acrylate copolymer, propylene-butyl acrylate copolymer, ethylene-vinyl acetate copolymer, propylene-vinyl acetate copolymer, and the like.

Examples of the polymer can be an amide-based polymer such as an amide-based elastomer and an amide-based resin. Examples of the amide-based polymer include polyamide 6, polyamide 11, polyamide 12, polyamide 66, polyamide 610, and the like.

Examples of the polymer can be an ester-based polymer such as an ester-based elastomer and an ester-based resin. Examples of the ester-based polymer include polyethylene terephthalate, polybutylene terephthalate, and the like.

Examples of the polymer can be a urethane-based polymer such as a urethane-based elastomer and a urethane-based resin. Examples of the urethane-based polymer include polyester-based polyurethane, polyether-based polyurethane, and the like.

Examples of the polymer can be a styrene-based polymer such as a styrene-based elastomer and a styrene-based resin. Examples of the styrene-based elastomer include styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of STS (styrene-ethylene-propylene-styrene copolymer (SEPS)), styrene-isobutylene-styrene copolymer (SIBS), styrene-butadiene-styrene-butadiene (SBSB), styrene-butadiene-styrene-butadiene-styrene (SBSBS), and the like. Examples of the styrene-based resin include polystyrene, acrylonitrile styrene resin (AS), acrylonitrile butadiene styrene resin (ABS), and the like.

Examples of the polymer include acrylic polymers such as polymethylmethacrylate, urethane-based acrylic polymers, polyester-based acrylic polymers, polyether-based acrylic polymers, polycarbonate-based acrylic polymers, epoxy-based acrylic polymers, conjugated diene polymer-based acrylic polymers and hydrogenated products thereof, urethane-based methacrylic polymers, polyester-based methacrylic polymers, polyether-based methacrylic polymers, polycarbonate-based methacrylic polymers, polyester-based urethane acrylate, polycarbonate-based urethane acrylate, polyether-based urethane acrylate, epoxy-based methacrylic polymers, conjugated diene polymer-based methacrylic polymers and hydrogenated products thereof, polyvinyl chloride-based resins, silicone-based elastomers, butadiene rubber, isoprene rubber (IR), chloroprene rubber (CR), natural rubber (NR), styrene-butadiene rubber (SBR), acrylonitrile-butadiene rubber (NBR), butyl rubber (TR), and the like.

The sole body 20 is preferably made of a material that enables flexible wearing comfort, and thus, the sole body 20 is preferably made particularly of urethane acrylate among the above-mentioned types of materials. The sole body 20 made of urethane acrylate not only has excellent durability and elongation but also has sufficient elasticity. As described above, the sole body 20 is produced by the vat polymerization-type three-dimensional additive manufacturing method.

The sole body 20 is formed of a three-dimensional mesh structure body. The three-dimensional mesh structure body has a structure in which a plurality of unit structures each having a hollow portion provided therein are repeatedly arranged so as to be adjacent to each other. Examples of such a unit structure include: a three-dimensional lattice structure having a three-dimensional shape in which a plurality of columnar portions extending in prescribed directions are connected to each other; a three-dimensional wall structure having a three-dimensional shape in which a plurality of wall portions extending in prescribed directions are connected to each other; a structure having a three-dimensional shape in which hollow portions are regularly arranged therein; and the like.

Applicable examples of the three-dimensional lattice structure defining a unit structure can be a structure in which a plurality of columnar portions are arranged such that each columnar portion extends to intersect a columnar portion adjacent thereto. Applicable examples of such a three-dimensional lattice structure can be various structures such as a rectangular parallelepiped lattice, a diamond lattice, an octahedral lattice, a double pyramid lattice, a fluorite type lattice, or a lattice having various supports added thereto.

Applicable examples of the three-dimensional wall structure defining a unit structure can be a structure having a three-dimensional shape formed by a wall having an outer shape defined by a pair of parallel curved surfaces. Specific examples applicable in this case can be, for example, a structure obtained by adding a thickness to a triply periodic minimal surface, such as a gyroid structure, a Schwartz P structure, or a Schwartz D structure as a base structure. Further, applicable examples of the three-dimensional wall structure defining a unit structure can be a structure having a three-dimensional shape formed by a wall having an outer shape defined by a pair of parallel flat surfaces. Specific examples applicable in this case can be a structure obtained by adding a thickness to an octet structure, a cubic structure, or the like.

When the sole body 20 is formed of the three-dimensional mesh structure body as described above, it is preferable to distort individual unit structures as necessary such that the outer shape of the three-dimensional mesh structure body coincides with the outer shape of the sole body 20. This enables the sole body 20 to have a smooth outer surface.

The sole body 20 formed of a three-dimensional mesh structure body as described above has high deformability. This makes it possible to implement a sole with excellent wearing comfort, excellent shock absorbing performance and also enhanced stability when the footwear 1A is worn. Further, the sole body 20 having the above-described configuration makes it possible to implement a sole that is lightweight considering its size and further a sole excellent in air permeability.

The sole body 20 is made of an elastic material having an elastic modulus of greater than or equal to 0.1 MPa and less than or equal to 100 MPa. Accordingly, when a load is applied to the footbed portion 21 of the sole body 20 (that is, during landing, during stepping out, and the like), the footbed portion 21 has high cushioning performance, and foot pressure can be effectively dispersed.

As shown in FIG. 6 and FIGS. 8 to 10, the support region 26 of the footbed portion 21 of the sole body 20 partially includes the upper surface-side projection portion forming region 30a in which the plurality of upper surface-side projection portions 30 are arranged so as to stand side by side.

As shown in FIGS. 9A and 9B, each of the plurality of upper surface-side projection portions 30 has a tapered shape that is thinner from a root side toward a tip end side and has a rounded tip. A cross-sectional shape orthogonal to the projecting direction of each of the plurality of upper surface-side projection portions 30 is a substantially circular shape, but is not particularly limited thereto, and can be a substantially elliptical shape, a substantially rectangular shape, a polygonal shape, or the like.

In addition, an angle formed by the upper surface of the footbed portion 21 and each of the plurality of upper surface-side projection portions 30 is 90°. Accordingly, the molding accuracy of the upper surface-side projection portion 30 can be improved.

The maximum outer dimension (see dimension D in FIG. 9B) in the cross-section orthogonal to the projecting direction of each of the plurality of upper surface-side projection portions 30 is less than or equal to 3.0 mm.

Furthermore, in the sole body 20 according to the present embodiment, when each of the plurality of upper surface-side projection portions 30 has the tapered shape in which a tip end portion is a rounded tip, in a portion included within 900% from the root side of an entire length in the projecting direction of each of the plurality of upper surface-side projection portions 30, a minimum outer dimension in the cross-section orthogonal to the projecting direction is preferably greater than or equal to 0.5 mm. Accordingly, the molding accuracy of the upper surface-side projection portion 30 can be improved. Note that this effect is similarly exerted in sole bodies 20A4, 20A11 to 20A13, 20A15 to 20A18, and 20A20 according to Modification Examples 4, 11 to 13, 15 to 18, and 20 to be described later.

In addition, each of the plurality of upper surface-side projection portions 30 has a projection length H (see FIG. 9B) of greater than or equal to 4.0 mm and less than or equal to 13.0 mm.

As shown in FIG. 10, the upper surface-side projection portion forming region 30a is disposed in all the regions of the support region 26 except for portions located on a front end side, a rear end side, and the lateral foot side of the peripheral edge portion of the support region 26.

The arrangement density of the plurality of upper surface-side projection portions 30 in the upper surface-side projection portion forming region 30a is greater than or equal to 10% and less than or equal to 100% in terms of the area ratio.

Note that the arrangement density of the plurality of upper surface-side projection portions 30 means a ratio of an area of the root portion of the upper surface-side projection portions 30 per 1 cm² in the upper surface-side projection portion forming region 30a when viewed from a direction orthogonal to the upper surface-side projection portion forming region 30a.

The upper surface-side projection portion forming region 30a includes a dense region 30a1 which is a region where the arrangement density of the plurality of upper surface-side projection portions 30 is relatively high, and a sparse region 30a2 where the arrangement density is relatively low. The sparse region 30a2 is located in a region that straddles the forefoot portion R1, the midfoot portion R2, and the rearfoot portion R3 (that is, the region corresponding to a portion on the medial foot side of the arch portion of the wearer) within the upper surface-side projection portion forming region 30a, and the dense region 30a1 is located in a remaining region thereof.

The footbed portion 21 includes a defining member that defines the upper surface-side projection portion forming region 30a, and in the present embodiment, the defining member constitutes a part of the sole body 20 which is a single molded object molded by the three-dimensional additive manufacturing method described above. In addition, as described above, the sole body 20 is made of the elastic material having an elastic modulus of greater than or equal to 0.1 MPa and less than or equal to 100 MPa.

In other words, similarly to the sole body 20, the material constituting the plurality of upper surface-side projection portions 30 is made of the elastic material having an elastic modulus of greater than or equal to 0.1 MPa and less than or equal to 100 MPa.

Figure 11:
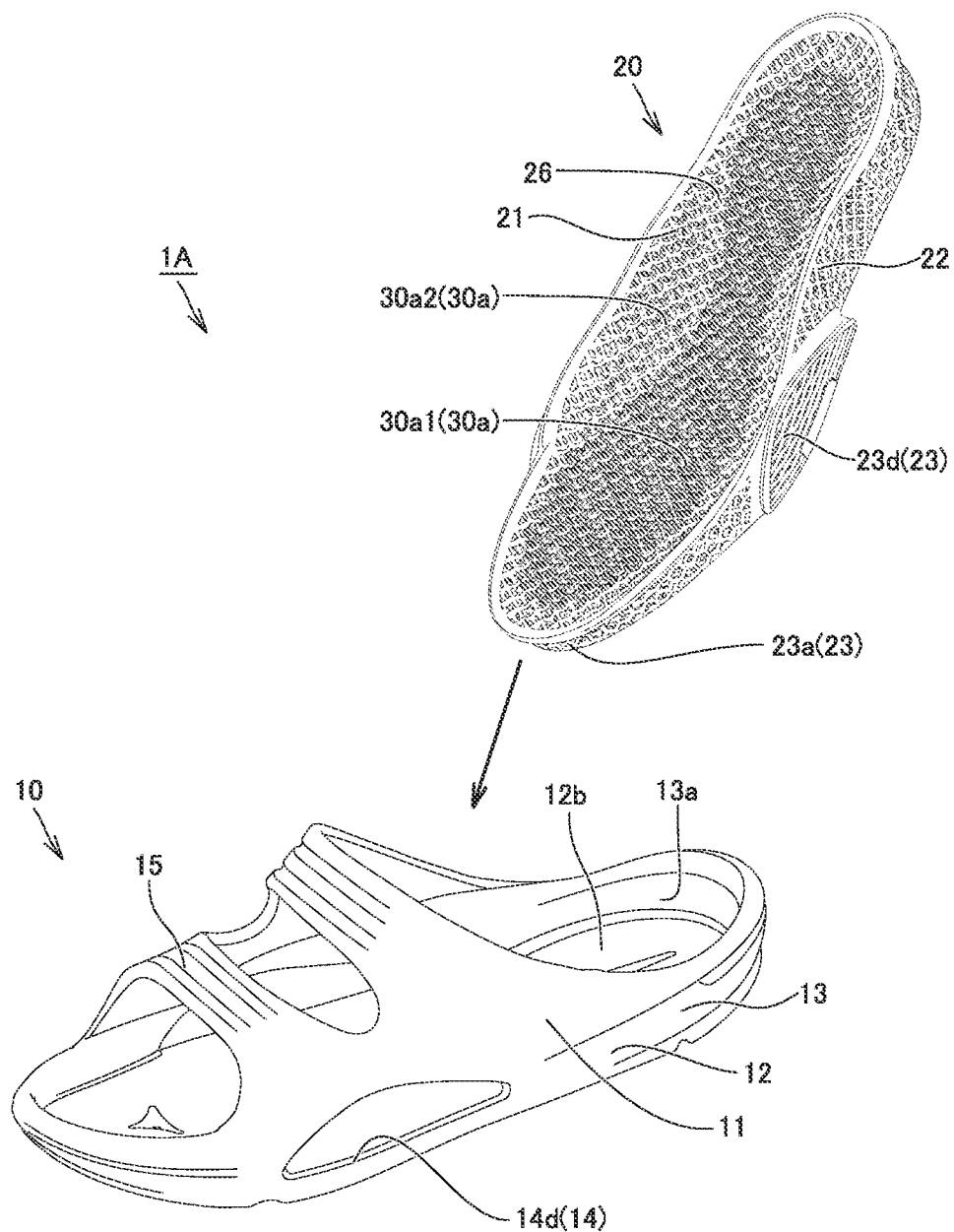
FIG. 11 is a schematic view for illustrating a method of attaching the sole body shown in FIG. 6 on the shell shown in FIG. 3.

FIG. 11 is a schematic view illustrating the method of attaching the sole body shown in FIG. 6 on the shell shown in FIG. 3. With reference to FIG. 11, next, the method of attaching the sole body 20 on the shell 10 in the footwear 1A according to the present embodiment will be described.

As shown in FIG. 11, when using the footwear 1A, the sole body 20 is inserted into the hollow portion of the shell 10 through the topline 16 provided in the shell 10. With the sole body 20 inserted into the shell 10 in this manner, the supported region 27 (see FIG. 7) located on a lower surface of the footbed portion 21 is placed on and supported by the upper bottom surface 12b of the base portion 12 of the outsole portion 11, and the peripheral surface 22 of the footbed portion 21 is arranged to face the inner side surface 13a of the peripheral wall portion 13 of the outsole portion 11. In addition, the plurality of through holes 12c provided in the base portion 12 of the outsole portion 11 face the lower surface of the footbed portion 21.

In addition, when the sole body 20 is inserted into the shell, the front-side engaging portion 23a of the sole body 20 is engaged with the front-side engaged portion 14a of the outsole portion 11 at the front-side portion of the footwear 1A, and the rear-side engaging portion 23b of the sole body 20 is engaged with the rear-side engaged portion 14b of the outsole portion 11 at the rear-side portion of the footwear 1A. Furthermore, the medial foot-side engaging portion 23c of the sole body 20 is engaged with the medial foot-side engaged portion 14c of the outsole portion 11 at the portion on the medial foot side of the footwear 1A, and the lateral foot-side engaging portion 23d of the sole body 20 is engaged with the lateral foot-side engaged portion 14d of the outsole portion 11 at the portion on the lateral foot side of the footwear 1A.

Engaging the plurality of engaging portions 23 with the plurality of engaged portions 14 can firmly fix the sole body 20 to the shell 10. Therefore, it is possible to provide the footwear 1A in which the sole body 20 formed of the three-dimensional mesh structure can be incorporated without using an adhesive.

Here, in the footwear 1A according to the present embodiment, as described above, the maximum outer dimension in the cross-section orthogonal to the projecting direction of each of the plurality of upper surface-side projection portions 30 is less than or equal to 3.0 mm. In addition, the projection length of each of the plurality of upper surface-side projection portions 30 is greater than or equal to 4.0 mm and less than or equal to 13.0 mm, and the arrangement density of the plurality of upper surface-side projection portions 30 in the upper surface-side projection portion forming region 30a is greater than or equal to 10% and less than or equal to 100% in terms of the area ratio. Furthermore, the elastic modulus of the material constituting the plurality of upper surface-side projection portions 30 is greater than or equal to 0.1 MPa and less than or equal to 100 MPa.

By satisfying these conditions, the contact area between the upper surface-side projection portion forming region 30a and the wearer's foot can be dramatically reduced. Furthermore, with these conditions satisfied, the plurality of upper surface-side projection portions 30 have appropriate softness, and thus are appropriately deformed when the wearer puts the foot in.

Therefore, when the wearer puts the foot in the footwear 1A, the wearer's foot can smoothly move on the upper surface-side projection portion forming region 30a, and as a result, the foot can be easily and comfortably put in the footwear 1A.

Thus, with such a configuration, it is possible to provide the footwear that can secure good slippage with the wearer's foot.

In addition, in the footwear 1A according to the present embodiment, since the contact area is reduced as described above not only during putting the foot in but also after wearing, it is possible to improve the air permeability of the footwear 1A in the use state. Therefore, it is also possible to prevent heat from staying in a space between the upper surface-side projection portion forming region 30a and the wearer's foot.

Furthermore, in the footwear 1A according to the present embodiment, as described above, the plurality of through holes 12c are disposed in the base portion 12 of the outsole portion 11, and the plurality of through holes 12c face the lower surface of the footbed portion 21 formed of the three-dimensional mesh structure.

By the configuration as described above, the plurality of through holes 12c are located below the footbed portion 21 having excellent air permeability. Thus, the air retained between the base portion 12 of the outsole portion 11 and the wearer's foot sole during use of the footwear 1A can be discharged not only from above the footbed portion 21 but also from below the footbed portion 21, with the result that excellent air permeability during use of the footwear 1A can be ensured.

Further, as described above, the plurality of through holes 12c are disposed in the portions located in the central portion in the foot width direction and corresponding to the ball portion and the heel portion of the wearer's foot, where air relatively tends to be retained during use of the footwear 1A. Thereby, the footwear 1A can have excellent air permeability.

The through holes 12c each can have a tapered shape that tapers from the upper bottom surface 12b side toward the ground contact surface 12a side. The configuration as described above makes it possible to effectively prevent intrusion of foreign substances from the ground contact surface 12a side.

Furthermore, in the footwear 1A according to the present embodiment, the sparse region 30a2, which is the region where the arrangement density of the plurality of upper surface-side projection portions 30 is relatively low, is arranged in the region corresponding to the portion on the medial foot side of the arch portion of the wearer in the upper surface-side projection portion forming region 30a.

With such a configuration, it is possible to reduce the contact between the arch portion, which is a particularly sensitive part of the foot sole of the wearer, and the upper surface-side projection portion 30 while securing improved slippage over the entire surface of the support region 26, thereby reducing the discomfort felt by the wearer. In addition, with such a configuration, a lightweight sole body 20 can be achieved as compared with a case where the entire upper surface-side projection portion forming region 30a is the dense region 30a1.

In addition, as described above, the footwear 1A according to the present embodiment is used as a sandal. The sandal is required to have easiness and comfort in putting the foot in particularly because of nature as a product that the wearer frequently puts on and takes off the sandal. Thus, securing improved slippage of the footwear 1A as the sandal as described above makes it possible to dramatically improve added value as a product.

Note that the above-described footwear 1A according to the present embodiment has been described in a case where the sole body 20 is manufactured by the vat polymerization-type three-dimensional additive manufacturing method, but the method of manufacturing the sole body 20 is not particularly limited thereto, and can be manufactured by, for example, the injection molding, the cast molding, or the like.

In addition, the above-described footwear 1A according to the present embodiment has been described in a case where the sparse region 30a2 is arranged in the region corresponding to the portion on the medial foot side of the arch portion of the wearer in the upper surface-side projection portion forming region 30a has been described. However, the region is not necessarily the sparse region 30a2, and the arrangement density of the plurality of upper surface-side projection portions 30 in the region can be appropriately changed according to an arch height of the wearer's foot.

Modification Examples 1 to 3

Figure 12A:
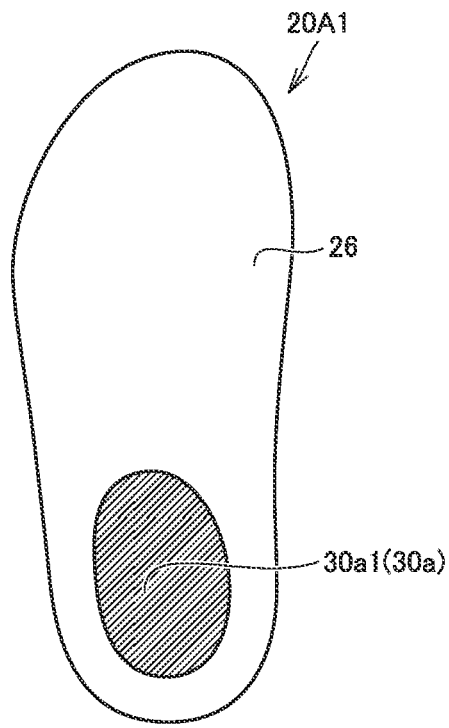
FIG. 12A to FIG. 12C are schematic plan views showing the distribution of the upper surface-side projection portion forming region of the sole body according to Modification Examples 1 to 3.
Figure 12B:
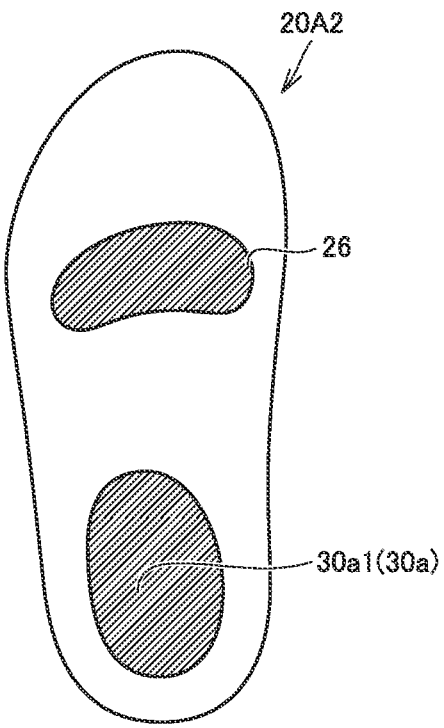
Figure 12C:
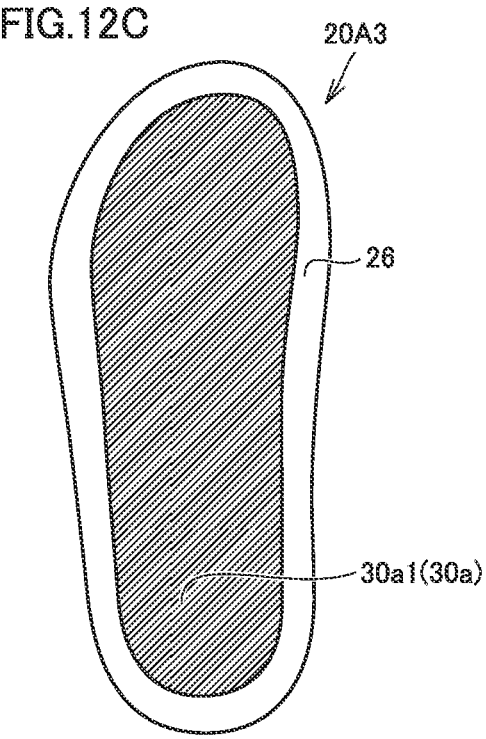

FIGS. 12A to 12C are schematic plan views showing the distributions of upper surface-side projection portion forming regions of sole bodies according to Modification Examples 1 to 3, respectively. With reference to FIGS. 12A to 12C, hereinafter, the sole bodies 20A1 to 20A3 used in the footwear according to Modification Examples 1 to 3 based on Embodiment 1 described above will be described.

As shown in FIGS. 12A to 12C, the sole bodies 20A1 to 20A3 used in the footwear according to the Modification Examples 1 to 3 based on Embodiment 1 are different from the sole body 20 used in the footwear 1A according to Embodiment 1 only in the distribution of the upper surface-side projection portion forming region 30a. Note that in the sole bodies 20A1 to 20A3, the upper surface-side projection portion forming region 30a includes only the dense region 30a1 described above.

As shown in FIG. 12A, in the sole body 20A1 used in the footwear according to Modification Example 1, the upper surface-side projection portion forming region 30a is arranged only in the rearfoot portion R3 (see FIG. 2). Since the rearfoot portion R3 is a region where the foot sole of the wearer is most likely to come into contact when the foot is put in, and is a region to which a largest load is applied, the rearfoot portion R3 is a region where securing good slippage is required particularly from a viewpoint of easily and comfortably putting the foot in.

Therefore, even with such a configuration, an effect similar to the effect described in Embodiment 1 described above can be obtained, making it possible to provide footwear capable of securing good slippage with the wearer's foot.

As shown in FIG. 12B, in the sole body 20A2 used in the footwear according to Modification Example 2, the upper surface-side projection portion forming region 30a is also arranged in a region straddling the boundary between the rearfoot portion R3 and the forefoot portion R1 and the midfoot portion R2 which are regions for supporting the foot sole of the portion corresponding to the MP joint of the wearer's foot. Since these regions are where the largest load is applied during putting foot in the support region 26, the regions are where securing good slippage is required particularly from the viewpoint of easily and comfortably putting foot in.

Therefore, even with such a configuration, an effect similar to the effect described in Embodiment 1 described above can be obtained, making it possible to provide footwear capable of securing good slippage with the wearer's foot.

As shown in FIG. 12C, in the sole body 20A3 used in the footwear according to Modification Example 3, the upper surface-side projection portion forming region 30a is disposed across the forefoot portion R1, the midfoot portion R2, and the rearfoot portion R3.

Also with such a configuration, an effect similar to the effect described in relation to Embodiment 1 described above can be obtained, making it possible to provide the footwear capable of securing good slippage with the wearer's foot.

Modification Example 4

Figure 13:
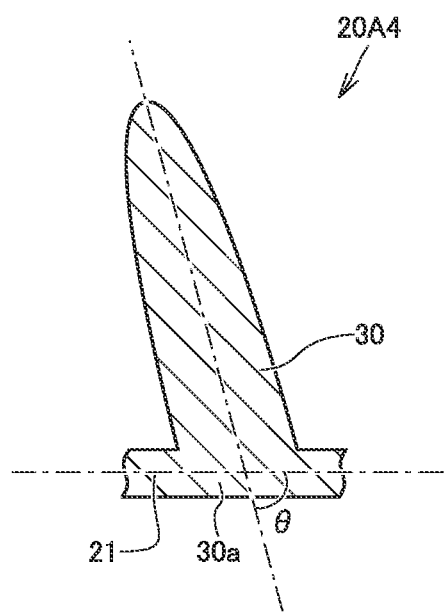
FIG. 13 is a schematic cross-sectional view of the upper surface-side projection portion of the sole body according to Modification Example 4.

FIG. 13 is a schematic cross-sectional view of the upper surface-side projection portion of the sole body according to Modification Example 4. With reference to FIG. 13, hereinafter, the sole body 20A4 used in the footwear according to Modification Example 4 based on Embodiment 1 described above will be described.

As shown in FIG. 13, the sole body 20A4 used in the footwear according to Modification Example 4 differs from the sole body 20 used in the footwear 1A according to Embodiment 1 described above in shapes of the upper surface-side projection portion 30.

More specifically, in the sole body 20A4, each of the plurality of upper surface-side projection portions 30 is inclined from the rear end side toward the front end side of the footwear as it extends from the root side toward the tip end side. In addition, a smaller angle (that is, an angle θ shown in FIG. 13) of angles formed by the upper surface of the footbed portion 21 and each of the plurality of upper surface-side projection portions 30 is greater than or equal to 20° and less than 90o.

Also with such a configuration, an effect similar to the effect described in relation to Embodiment 1 described above can be obtained, making it possible to provide the footwear capable of securing good slippage with the wearer's foot.

In addition, with such a configuration, when the wearer detaches the footwear, the plurality of upper surface-side projection portions 30 project in the direction against a detachment direction of the wearer's foot. Therefore, the footwear is difficultly attached and detached by application of a drag by the plurality of upper surface-side projection portions 30 to the foot sole of the wearer, and as a result, it is possible to provide the footwear in which insertion of the foot is easy and an unintentional attachment and detachment is effectively suppressed.

Note that the plurality of upper surface-side projection portions 30 inclined as described above can be provided only in any one of the midfoot portion R2 and the rearfoot portion R3, which are regions where the foot sole is most likely to come into contact when the wearer detaches the footwear. In addition, an inclination direction and an inclination angle of each of the plurality of upper surface-side projection portions 30 can be appropriately changed for each position where each of the plurality of upper surface-side projection portions is disposed.

Modification Examples 5 to 20

Figure 14A:
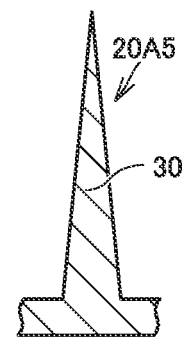
FIG. 14A to FIG. 14P are schematic cross-sectional views of the upper surface-side projection portion of the sole body according to Modification Examples 5 to 20.
Figure 14B:
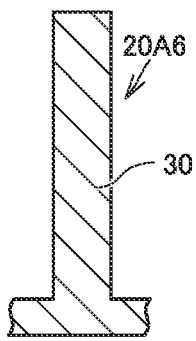
Figure 14C:
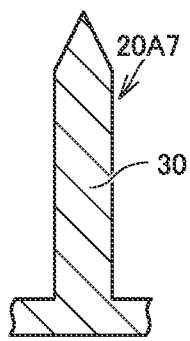
Figure 14D:
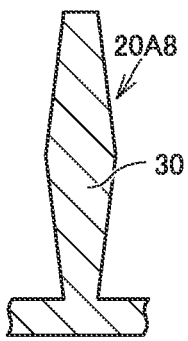
Figure 14E:
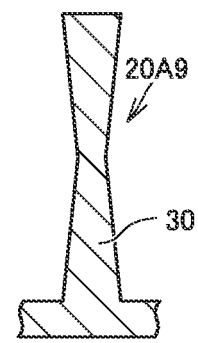
Figure 14F:
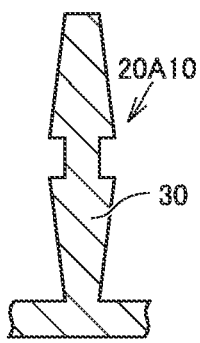
Figure 14G:
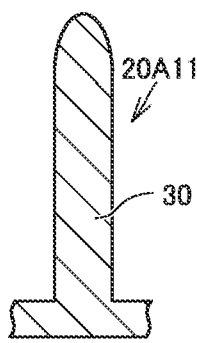
Figure 14H:
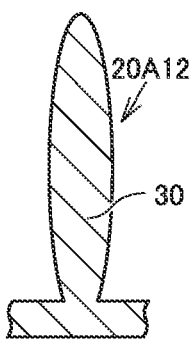
Figure 14I:
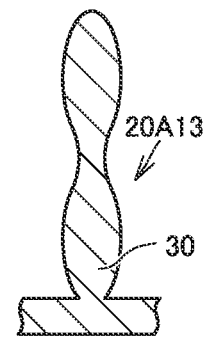
Figure 14J:
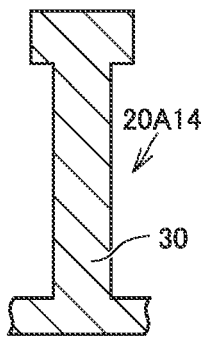
Figure 14K:
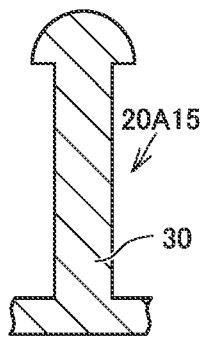
Figure 14L:
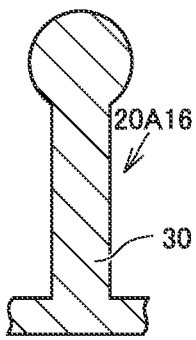
Figure 14M:
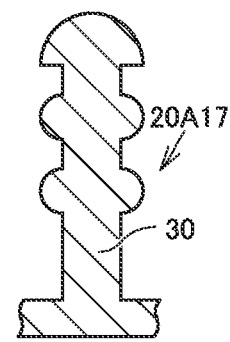
Figure 14N:
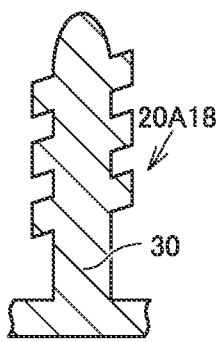
Figure 14O:
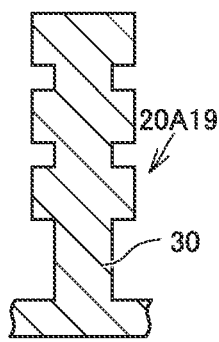
Figure 14P:
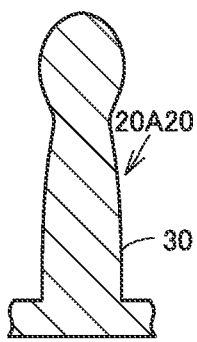

FIGS. 14A to 14P are schematic cross-sectional views of upper surface-side projection portions of the sole bodies according to Modification Examples 5 to 20, respectively. With reference to FIGS. 14A to 14P, hereinafter, sole bodies 20A5 to 20A20 used in the footwear according to Modification Examples 5 to 20 based on Embodiment 1 described above will be described.

As shown in FIGS. 14A to 14P, the sole bodies 20A5 to 20A20 used in the footwear according to Modification Examples 5 to 20 based on Embodiment 1 are different from the sole body 20 used in the footwear 1A according to Embodiment 1 described above in the shapes of the upper surface-side projection portion 30.

As shown in FIG. 14A, in the sole body 20A5 used in the footwear according to Modification Example 5, each of the plurality of upper surface-side projection portions 30 has the tapered shape that becomes thinner from the root side toward the tip end side and has a pointed tip.

As shown in FIG. 14B, in the sole body 20A6 used in the footwear according to Modification Example 6, each of the plurality of upper surface-side projection portions 30 has a constant outer shape in the case of the plan view from the root side to the tip end side.

As shown in FIG. 14C, in the sole body 20A7 used in the footwear according to Modification Example 7, each of the plurality of upper surface-side projection portions 30 has the constant outer shape in the case of the plan view from the root to a predetermined position located on the tip end side of the root, and has a shape that thins from the predetermined position toward the tip. In addition, each of the plurality of upper surface-side projection portions 30 has a pointed tip.

As shown in FIG. 14D, in the sole body 20A8 used in the footwear according to Modification Example 8, the outer shape of each of the plurality of upper surface-side projection portions 30 in the case of the plan view increases from the root toward the predetermined position located on the tip end side of the root, and the outer shape decreases from the predetermined position toward the tip. In addition, each of the plurality of upper surface-side projection portions 30 has a flat tip.

As shown in FIG. 14E, in the sole body 20A9 used in the footwear according to Modification Example 9, the outer shape of each of the plurality of upper surface-side projection portions 30 in the case of the plan view decreases from the root toward the predetermined position located on the tip end side of the root, and the outer shape increases from the predetermined position toward the tip.

As shown in FIG. 14F, in the sole body 20A10 used in the footwear according to Modification Example 10, each of the plurality of upper surface-side projection portions 30 has the root portion, the tip end portion, and an intermediate portion located therebetween.

The outer shape of the root portion in the case of the plan view increases from the root toward the tip end side. The outer shape of the tip end portion decreases from the root side toward the tip. The outer shape of the intermediate portion is constant in the projecting direction of the upper surface-side projection portions 30.

As shown in FIG. 14G, in the sole body 20A11 used in the footwear according to Modification Example 11, each of the plurality of upper surface-side projection portions 30 has the constant outer shape in the case of the plan view from the root to the predetermined position located on the tip end side of the root, and has a shape that becomes thinner from the predetermined position toward the tip. In addition, each of the plurality of upper surface-side projection portions 30 has a rounded tip.

As shown in FIG. 14H, in the sole body 20A12 used in the footwear according to Modification Example 12, the outer shape of each of the plurality of upper surface-side projection portions 30 in the case of the plan view increases from the root toward the predetermined position located on the tip end side of the root, and the outer shape decreases from the predetermined position toward the tip. In addition, each of the plurality of upper surface-side projection portions 30 has a rounded tip.

As shown in FIG. 14I, in the sole body 20A13 used in the footwear according to Modification Example 13, each of the plurality of upper surface-side projection portions 30 has a root portion and a tip end portion.

The root portion has a shape in which the outer shape of the central portion is larger than the outer shapes of both end portions in the projecting direction in the case of the plan view. Similarly, the tip end portion also has a shape in which the outer shape of the central portion is larger than the outer shapes of both end portions in the projecting direction thereof.

As shown in FIG. 14J, in the sole body 20A14 used in the footwear according to Modification Example 14, each of the plurality of upper surface-side projection portions 30 has the root portion and the tip end portion. The tip end portion projects from a portion on a tip end portion side of the root portion in a direction orthogonal to the projecting direction of the root portion.

As shown in FIG. 14K, in the sole body 20A15 used in the footwear according to Modification Example 15, each of the plurality of upper surface-side projection portions 30 has the root portion and the tip end portion, and the tip end portion has a hemispherical shape.

As shown in FIG. 14L, in the sole body 20A16 used in the footwear according to Modification Example 16, each of the plurality of upper surface-side projection portions 30 has the root portion and the tip end portion, and the tip end portion has a spherical shape.

As shown in FIG. 14M, in the sole body 20A17 used in the footwear according to Modification Example 17, each of the plurality of upper surface-side projection portions 30 has the root portion and the tip end portion. The tip end portion has the hemispherical shape, and the root portion includes a ridge portion projecting in the direction orthogonal to the projecting direction at two positions in the projecting direction. The tip end of the ridge portion is the rounded tip.

As shown in FIG. 14N, in the sole body 20A18 used in the footwear according to Modification Example 18, each of the plurality of upper surface-side projection portions 30 includes the root portion and three ridge portions which are not orthogonal to the projecting direction of the root portion but project from the root portion in a direction intersecting the projecting direction. The tip ends of the three ridge portions have a flat shape.

As shown in FIG. 14O, in the sole body 20A19 used in the footwear according to Modification Example 19, each of the plurality of upper surface-side projection portions 30 includes the root portion and three ridge portions projecting from the root portion in the direction orthogonal to the projecting direction of the root portion. One of the three ridge portions is disposed at a portion on the tip end side of the root portion. The tip ends of the three ridge portions have a flat shape.

As shown in FIG. 14P, in the sole body 20A20 used in the footwear according to Modification Example 20, each of the plurality of upper surface-side projection portions 30 has the root portion and the tip end portion. The tip end portion has a substantially elliptical spherical shape. The root portion has a shape in which an outer shape in the case of the plan view increases with a distance from the tip end portion. Therefore, the upper surface-side projection portions 30 in the present modification example have a constricted portion at the boundary between the root portion and the tip end portion.

Even in a case where the footwear is configured as the footwear according to Modification Examples 5 to 20, effects similar to those described in relation to Embodiment 1 described above can be obtained, making it possible to provide footwear capable of securing improved slippage with the wearer's foot.

In addition, in the case of the footwear according to Modification Examples 5 to 7, each of the plurality of upper surface-side projection portions 30 has the tapered shape, or has the constant outer shape in the case of the plan view from the root side to the tip end side. Accordingly, since the contact area between the upper surface-side projection portion forming region 30a and the wearer's foot can be reduced, improved slippage between the upper surface-side projection portion forming region and the wearer's foot can be better secured, and the footwear having better air permeability can be obtained. Here, in a case where hardness of each of the plurality of upper surface-side projection portions 30 is made lower, the tip end thereof is easily deformed, so that the wearer can feel the softness at the foot sole. On the other hand, in a case where the hardness of each of the plurality of upper surface-side projection portions 30 is higher, the wearer can feel local stimulation at the foot sole.

Furthermore, in the case where the footwear is configured as the footwear according to Modification Examples 8 to 10, Modification Example 12, Modification Example 13, and Modification Example 20, each of the plurality of upper surface-side projection portions 30 has the constricted portion. Accordingly, since each of the plurality of upper surface-side projection portions 30 is easily deformed with the constricted portion as a starting point, the wearer can feel the softness at the foot sole.

In addition, in the case of the footwear according to Modification Example 11, Modification Example 15, Modification Example 16, and Modification Example 20, the tip end of each of the plurality of upper surface-side projection portions 30 has the rounded tip. Accordingly, the stimulation felt by the wearer at the foot sole can be alleviated.

Furthermore, in the case of the footwear according to Modification Example 14, the outer shape of each of the plurality of upper surface-side projection portions 30 in the case of the plan view is maximized at the tip end. Accordingly, the contact area with the foot sole of the wearer becomes relatively large, and as a result, the stimulation felt by the wearer at the foot sole can be alleviated.

In addition, in the case of the footwear according to Modification Examples 17 and 18, the tip end of each of the plurality of upper surface-side projection portions 30 has the rounded tip and has the constricted portion. Accordingly, not only the stimulation felt by the wearer at the foot sole can be alleviated, but also the softness can be felt.

Furthermore, in the case of the footwear according to Modification Example 19, the outer shape of each of the plurality of upper surface-side projection portions 30 in the case of the plan view is maximized at the tip end, and each of the plurality of upper surface-side projection portions 30 has the constricted portion. Accordingly, not only the stimulation felt by the wearer at the foot sole can be alleviated, but also the softness can be felt.

In addition, as in the footwear according to Modification Examples 5 to 7, in a case where each of the plurality of upper surface-side projection portions has the tapered shape in which the tip end portion is pointed, in a portion included within 80% inclusive from the root side of the entire length in the projecting direction of each of the plurality of upper surface-side projection portions, the minimum outer dimension in the cross-section orthogonal to the projecting direction is preferably greater than or equal to 0.5 mm. Accordingly, the molding accuracy of the upper surface-side projection portion can be improved.

Furthermore, as in the footwear according to Modification Examples 6, 8 to 10, 14, and 19, in a case where each of the plurality of upper surface-side projection portions does not have the tapered shape at the tip end portion, the minimum outer dimension in the cross-section orthogonal to the projecting direction is preferably greater than or equal to 0.5 mm over the entire length in the projecting direction of each of the plurality of upper surface-side projection portions. Accordingly, the molding accuracy of the upper surface-side projection portion can be improved.

Modification Example 21

Figure 15:
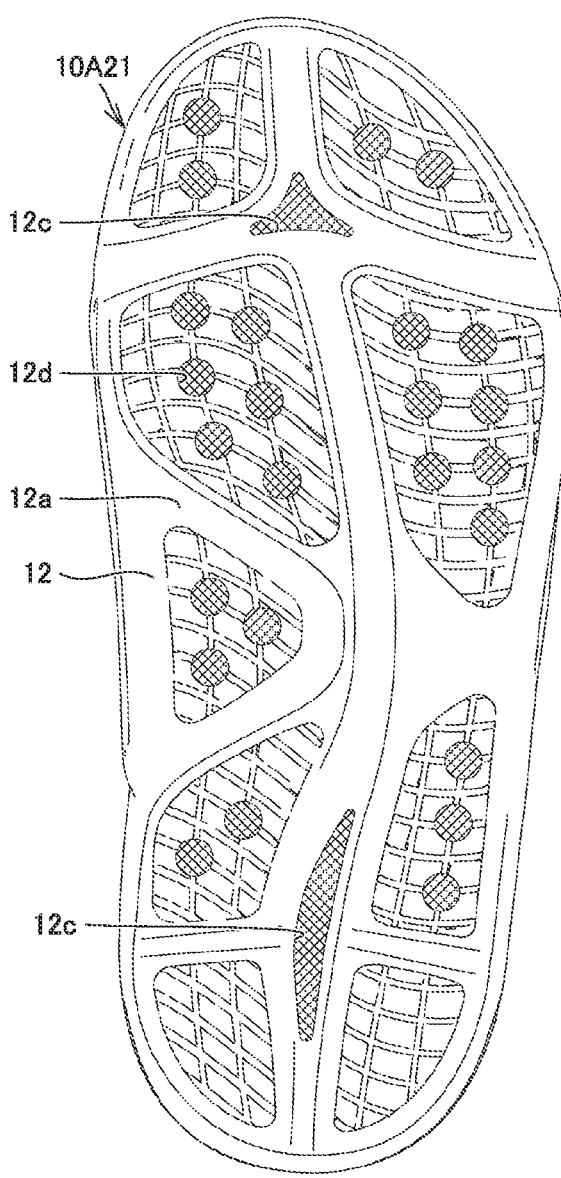
FIG. 15 is a bottom view of footwear according to Modification Example 21.

FIG. 15 is a bottom view of footwear according to Modification Example 21. With reference to FIG. 15, hereinafter, a shell 10A21 used in footwear 1A21 according to Modification Example 21 based on Embodiment 1 described above will be described.

As shown in FIG. 15, the shell 10A21 used in the footwear 1A21 according to Modification Example 21 based on Embodiment 1 is different from the shell 10 used in the footwear 1A according to Embodiment 1 described above in the configuration of the base portion 12.

More specifically, in the shell 10A21 used in the footwear 1A21 according to Modification Example 21, the base portion 12 is further provided with a plurality of auxiliary through holes 12d in addition to the plurality of through holes 12c described above.

Like the plurality of through holes 12c, the plurality of auxiliary through holes 12d are disposed in the base portion 12 so as to reach a portion defining the ground contact surface 12a of the base portion 12 and a portion defining the upper bottom surface 12b. The plurality of auxiliary through holes 12d are interspersed over the entire surface of the base portion 12.

Also with such a configuration, an effect similar to the effect described in relation to Embodiment 1 described above can be obtained, making it possible to provide footwear capable of securing improved slippage with the wearer's foot.

In addition, with such a configuration, it is possible to secure better air permeability during use of the footwear.

Embodiment 2

Figure 16A:
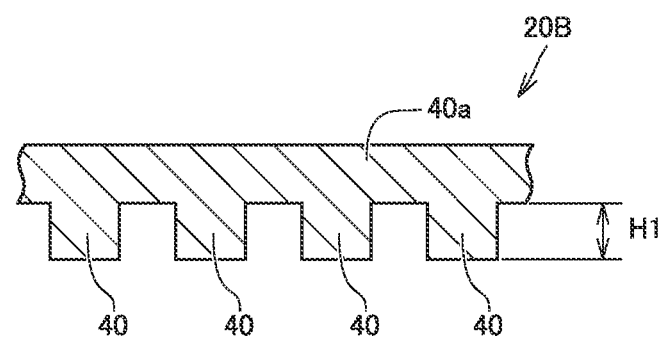
FIG. 16A and FIG. 16B are schematic views for illustrating a configuration of lower surface-side projection portions and a lower surface-side projection portion forming region of the sole body of the footwear according to Embodiment 2.
Figure 16B:
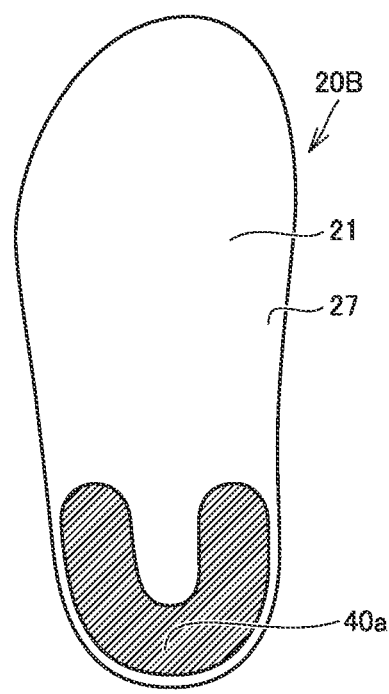

FIGS. 16A and 16B are schematic views illustrating the configuration of the lower surface-side projection portions and the lower surface-side projection portion forming region of the sole body of the footwear according to Embodiment 2. FIG. 16A is a schematic cross-sectional view illustrating the shape of the lower surface-side projection portions, and FIG. 16B is a schematic plan view showing the distribution of the lower surface-side projection portion forming region of the sole body. With reference to FIGS. 16A and 16B, hereinafter, a sole body 20B used in the footwear according to the present embodiment will be described. Note that, in FIG. 16B, only the lower surface of the footbed portion 21 located on a back side of the drawing sheet is transparently shown (the same applies to FIGS. 17A and 17B to be described later).

As shown in FIGS. 16A and 16B, the sole body 20B used in the footwear according to the present embodiment is different from the footwear 1A according to Embodiment 1 in that the supported region 27 (see FIG. 7) of the footbed portion 21 on the lower surface thereof partially includes a lower surface-side projection portion forming region 40a in which a plurality of lower surface-side projection portions 40 are arranged so as to stand side by side.

As shown in FIG. 16A, each of the plurality of lower surface-side projection portions 40 has a substantially columnar shape. The maximum outer dimension in the cross-section orthogonal to the projecting direction of each of the plurality of lower surface-side projection portions 40 is greater than or equal to 3.0 mm. In addition, each projection length HI of the plurality of lower surface-side projection portions 40 is less than or equal to 2.0 mm. Note that the shape of the lower surface-side projection portions 40 is not particularly limited to the substantially columnar shape, and can be a substantially conical shape, a substantially pyramidal shape, a substantially prismatic shape, or the like.

As shown in FIG. 16B, the lower surface-side projection portion forming region 40a is disposed on the peripheral edge of the rearfoot portion R3. The arrangement density of the plurality of lower surface-side projection portions 40 in the lower surface-side projection portion forming region 40a is greater than or equal to 50% and less than or equal to 100% in the area ratio.

Here, the defining member that defines the upper surface-side projection portion forming region 30a described above also defines the lower surface-side projection portion forming region 40a, and in the present embodiment, the defining member constitutes a part of the sole body 20B which is a single molded object molded by the three-dimensional additive manufacturing method described above. In addition, the sole body 20B is made of the elastic material having an elastic modulus of greater than or equal to 0.1 MPa and less than or equal to 100 MPa.

In other words, the material of which the plurality of lower surface-side projection portions 40 are formed is an elastic material having an elastic modulus of greater than or equal to 0.1 MPa and less than or equal to 100 MPa.

Also with such a configuration, an effect similar to the effect described in relation to Embodiment 1 described above can be obtained, making it possible to provide the footwear capable of securing good slippage with the wearers foot.

In addition, by forming the lower surface-side projection portions 40 and the lower surface-side projection portion forming region 40a as described above, the plurality of lower surface-side projection portions 40 can secure a relatively large contact area with the upper bottom surface 12b of the base portion 12 of the outsole portion 11 when the footwear is worn. Furthermore, since the plurality of lower surface-side projection portions 40 have the appropriate softness, the lower surface-side projection portions come into pressure contact with the upper bottom surface 12b in a state of being crushed by the load of the wearer when the footwear is worn.

Thus, such a configuration makes it possible to effectively prevent the sole body 20B from sliding with respect to the base portion 12 of the outsole portion 11, thus making it possible to provide footwear with enhanced stability when worn.

Modification Examples 22 and 23

Figure 17A:
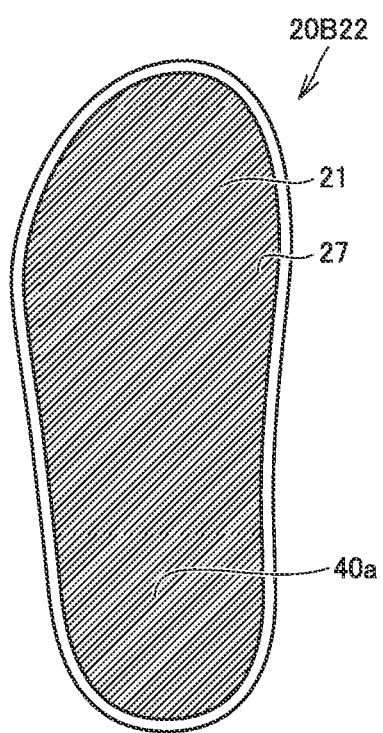
FIG. 17A and FIG. 17B are schematic plan views showing a distribution of the lower surface-side projection portion forming region of the sole body according to Modification Examples 22 and 23.
Figure 17B:
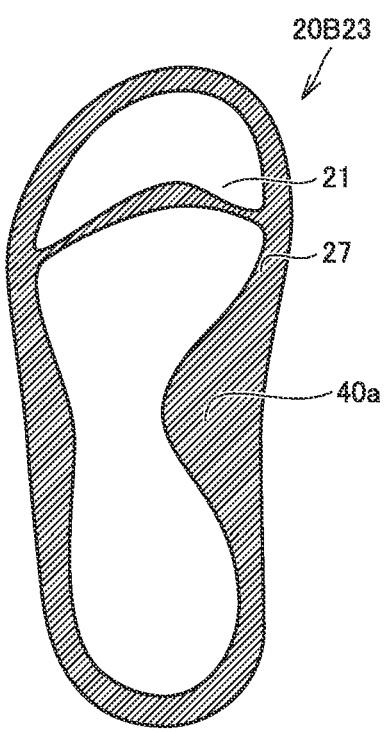

FIGS. 17A and 17B are schematic plan views showing the distributions of the lower surface-side projection portion forming regions according to Modification Examples 22 and 23, respectively. With reference to FIGS. 17A and 17B, hereinafter, sole bodies 20B22 and 20B23 used in footwear according to Modification Examples 22 and 23 based on Embodiment 2 described above will be described.

As shown in FIGS. 17A and 17B, the sole bodies 20B22 and 20B23 used in the footwear according to Modification Examples 22 and 23 based on Embodiment 2 are different from the sole body 20B used in the footwear according to Embodiment 2 described above only in the distribution of the lower surface-side projection portion forming region 40a.

As shown in FIG. 17A, in the sole body 20B22 used in the footwear according to Modification Example 22, the lower surface-side projection portion forming region 40a is disposed across the forefoot portion R1, the midfoot portion R2, and the rearfoot portion R3.

As shown in FIG. 17B, in the sole body 20B23 used in the footwear according to Modification Example 23, the lower surface-side projection portion forming region 40a is arranged to circle around along the peripheral edge of the footbed portion 21. This region is where the foot pressure of the wearer is relatively low in the supported region 27.

Even in a case where the footwear is configured as the footwear according to Modification Examples 22 and 23, an effect similar to the effect described in relation to Embodiment 1 described above is obtained, making it possible to provide the footwear capable of securing good slippage with the wearer's foot.

Furthermore, even in a case where the footwear is configured as the footwear according to Modification Examples 22 and 23, an effect similar to the effect described in relation to Embodiment 2 described above can be obtained, and the sole bodies 20B22 and 20B23 can be effectively prevented from slipping with respect to the base portion 12 of the outsole portion 11. As a result, the footwear with enhanced stability when worn can be obtained.

Aspect

Characteristic configurations of the footwear disclosed in the embodiments described above are summarized as follows.

Aspect 1

Footwear according to one aspect of the present disclosure includes a footbed portion, in which
 the footbed portion includes a support region on an upper surface of the footbed portion, the support region supporting a foot sole of a wearer's foot; and
 the support region includes, in at least a part thereof, an upper surface-side projection portion forming region in which a plurality of upper surface-side projection portions are arranged side by side,
 a maximum outer dimension in a cross-section orthogonal to a projecting direction of each of the plurality of upper surface-side projection portions is less than or equal to 3.0 mm;
 a projection length of each of the plurality of upper surface-side projection portions is greater than or equal to 4.0 mm and less than or equal to 13.0 mm;
 an arrangement density of the plurality of upper surface-side projection portions in the upper surface-side projection portion forming region is greater than or equal to 10% and less than or equal to 100% in terms of an area ratio; and
 an elastic modulus of a material constituting the plurality of upper surface-side projection portions is greater than or equal to 0.1 MPa and less than or equal to 100 MPa.

Such a configuration makes it possible to dramatically reduce a contact area between the upper surface-side projection portion forming region and afoot of a wearer. Furthermore, with such a configuration, the plurality of upper surface-side projection portions have appropriate softness, and thus are appropriately deformed when the wearer puts the foot in. Therefore, when the wearer puts their foot into the footwear, the wearer's foot can smoothly move on the upper surface-side projection portion forming region, and as a result, the foot can be easily and comfortably put into the footwear. Thus, with such a configuration, it is possible to provide the footwear that can secure good slippage with the wearer's foot.

Aspect 2

In the footwear according to Aspect 1 described above, a minimum outer dimension in the cross-section orthogonal to the projecting direction of each of the plurality of upper surface-side projection portions can be greater than or equal to 0.5 mm.

With such a configuration, the molding accuracy of the upper surface-side projection portion can be improved.

Aspect 3

In the footwear according to Aspect 1 or 2 described above, the footbed portion includes at least a defining member that defines the upper surface-side projection portion forming region including the plurality of upper surface-side projection portions, and
 the defining member can be formed of a single molded object molded by a three-dimensional additive manufacturing method.

With such a configuration, the number of components constituting the footwear can be reduced.

Aspect 4

The footwear according to any one of Aspects 1 to 3 described above includes a forefoot portion that supports a toe portion and a ball portion of the wearer's foot, a midfoot portion that supports an arch portion of the wearer's foot, and a rearfoot portion that supports a heel portion of the wearer's foot, the upper surface-side projection portion forming region can be disposed in the rearfoot portion.

Since the rearfoot portion is a region in which a foot sole of the wearer is most likely to come into contact when the wearer puts the foot in, and is a region to which a largest load is applied, the rearfoot portion is a region in which particularly securing good slippage is required from a viewpoint of easily and comfortably putting the foot in. Thus, with such a configuration, it is possible to provide footwear that can secure improved slippage with the wearer's foot.

Aspect 5

The footwear according to any one of Aspects 1 to 3 described above includes the forefoot portion that supports the toe portion and the ball portion of the wearer's foot, the midfoot portion that supports the arch portion of the wearer's foot, and the rearfoot portion that supports the heel portion of the wearer's foot, and the upper surface-side projection portion forming region can be disposed in a region that straddles a boundary between the forefoot portion and the midfoot portion, the forefoot portion and the midfoot portion being a region that supports the foot sole of a portion corresponding to an MP joint of the wearer's foot.

Within the support region, since these regions are regions to which the largest load is applied during putting the foot in, these regions are regions in which the slippage is required to be secured particularly well from the viewpoint of easily and comfortably putting the foot in. Thus, with such a configuration, it is possible to provide the footwear that can secure good slippage with the wearer's foot.

Aspect 6

The footwear according to any one of Aspects 1 to 3 described above includes the forefoot portion that supports the toe portion and the ball portion of the wearer's foot, the midfoot portion that supports the arch portion of the wearer's foot, and the rearfoot portion that supports the heel portion of the wearer's foot, and the upper surface-side projection portion forming region can be disposed across the forefoot portion, the midfoot portion, and the rearfoot portion.

Such a configuration makes it possible to provide footwear capable of securing improved slippage between the footwear and the wearer's foot.

Aspect 7

In the footwear according to any one of Aspects 1 to 6 described above, an angle formed by the upper surface and each of the plurality of upper surface-side projection portions can be 90°.

With such a configuration, the molding accuracy of the upper surface-side projection portion can be improved.

Aspect 8

In the footwear according to any one of Aspects 1 to 6 described above, each of the plurality of upper surface-side projection portions is inclined from a rear end side toward a front end side of the footwear as being directed from a root side toward a tip end side, and a smaller angle of angles formed by the upper surface and each of the plurality of upper surface-side projection portions can be greater than or equal to 20° and less than 90°.

With such a configuration, in a case where the wearer detaches the footwear, the plurality of upper surface-side projection portions project in a direction against the direction in which the wearer's foot detaches. Thus, the footwear is difficult to attach and detach by application of drag by the plurality of upper surface-side projection portions to the foot sole of the wearer, and as a result, it is possible to provide footwear in which insertion of the foot is easy and an unintentional attachment and detachment is effectively suppressed.

Aspect 9

In the footwear according to any one of Aspects 1 to 8, each of the plurality of upper surface-side projection portions can have the tapered shape that becomes thinner from the root side toward the tip end side.

With such a configuration, since the contact area between the upper surface-side projection portion forming region and the wearer's foot can be reduced, slippage between the upper surface-side projection portion forming region and the wearer's foot can be better secured, and the footwear having better air permeability can be obtained.

Aspect 10

The footwear according to any one of Aspects 1 to 9 described above further includes a shell to which the footbed portion is attached in an attached state, the shell including at least an outsole portion including a ground contact surface and a foot cover portion covering an instep of the wearer's foot, in which the footbed portion has a supported region supported by the shell in the attached state on a lower surface thereof; and the supported region at least partially includes a lower surface-side projection portion forming region in which a plurality of lower surface-side projection portions are arranged side by side, the maximum outer dimension in the cross-section orthogonal to the projecting direction of each of the plurality of lower surface-side projection portions is greater than or equal to 3.0 mm;

the projection length of each of the plurality of lower surface-side projection portions is less than or equal to 2.0 mm;

the arrangement density of the plurality of lower surface-side projection portions in the lower surface-side projection portion forming region is greater than or equal to 50% and less than or equal to 100% in terms of the area ratio; and the elastic modulus of the material constituting the plurality of lower surface-side projection portions can be greater than or equal to 0.1 MPa and less than or equal to 100 MPa.

With such a configuration, when wearing the footwear, the plurality of lower surface-side projection portions can secure a relatively large contact area with the outsole portion. Furthermore, since the plurality of lower surface-side projection portions have appropriate softness, the plurality of lower surface-side projection portions come into pressure contact with the outsole portion in a state of being crushed by the load of the wearer when the footwear is worn. Thus, such a configuration makes it possible to effectively prevent the footbed portion from slipping with respect to the outsole portion, so that it is possible to provide footwear with enhanced stability when worn.

Aspect 11

In the footwear according to Aspect 10 described above, the footbed portion includes at least the defining member that defines the upper surface-side projection portion forming region including the plurality of upper surface-side projection portions and the lower surface-side projection portion forming region including the plurality of lower surface-side projection portions, and the defining member can be formed of the single molded object molded by the three-dimensional additive manufacturing method.

With such a configuration, the number of components constituting the footwear can be reduced.

Aspect 12

The footwear according to Aspect 10 or 11 described above includes the forefoot portion that supports the toe portion and the ball portion of the wearer's foot, the midfoot portion that supports the arch portion of the wearer's foot, and the rearfoot portion that supports the heel portion of the wearer's foot, and the lower surface-side projection portion forming region can be disposed at least on a peripheral edge of the rearfoot portion.

Such a configuration makes it possible to effectively prevent the footbed portion from slipping with respect to the outsole portion, so that it is possible to provide the footwear with enhanced stability when worn.

Aspect 13

The footwear according to Aspect 10 or 11 described above includes the forefoot portion that supports the toe portion and the ball portion of the wearer's foot, the midfoot portion that supports the arch portion of the wearer's foot, and the rearfoot portion that supports the heel portion of the wearer's foot, and the lower surface-side projection portion forming region can be disposed across the forefoot portion, the midfoot portion, and the rearfoot portion.

Such a configuration makes it possible to effectively prevent the footbed portion from slipping with respect to the outsole portion, so that it is possible to provide the footwear with enhanced stability when worn.

Aspect 14

In the footwear according to Aspect 10 or 11 described above, the lower surface-side projection portion forming region can be arranged to circle around along the peripheral edge of the footbed portion.

Such a configuration makes it possible to effectively prevent the footbed portion from slipping with respect to the outsole portion, so that it is possible to provide the footwear with enhanced stability when worn.

Aspect 15

In the footwear according to any one of Aspects 10 to 14 described above, each of the plurality of lower surface-side projection portions can have a substantially columnar shape.

With such a configuration, a molding accuracy of the lower surface-side projection portions can be improved.

Other Aspects and the Like

In the embodiments and the modification examples thereof described above, the description has been given by exemplifying the case where the footwear is the sandal including the shell and the sole body, and the sole body includes the footbed portion. However, the present disclosure can be applied to footwear as a shoe including a sole having a substantially flat shape as a whole, an upper having a bag shape covering a portion excluding the foot sole of the wearers foot, and a shoe insert including the footbed portion.

In addition, the shape, configuration, size, number, material, and the like of each unit described in the embodiments of the present disclosure and the modification examples thereof can be variously changed without departing from the gist of the present disclosure.

Furthermore, the characteristic configurations described in the embodiments of the present disclosure and the modification examples thereof can be naturally combined with each other without departing from the gist of the present disclosure.

Although the embodiments of the present disclosure have been described, it should be considered that the embodiments disclosed herein are illustrative in all respects and not restrictive. The scope of the present disclosure is shown by the claims, and it is intended that meanings equivalent to the claims and all modifications within the scope are included.

What is claimed is:

1. Footwear comprising:
a footbed portion including a support region on an upper surface of the footbed portion, the support region supporting a foot sole of a wearer's foot; and
a shell to which the footbed portion is attached, the shell including at least an outsole portion including a ground contact surface and a foot cover portion covering an instep of the wearer's foot
the support region including, in at least a part thereof, an upper surface-side projection portion forming region in which a plurality of upper surface-side projection portions are arranged side by side,
a maximum outer dimension in a cross-section orthogonal to a projecting direction of each of the plurality of upper surface-side projection portions is less than or equal to 3.0 mm,
a projection length of each of the plurality of upper surface-side projection portions is greater than or equal to 4.0 mm and less than or equal to 13.0 mm,
an arrangement density of root portions of the plurality of upper surface-side projection portions in the upper surface-side projection portion forming region is greater than or equal to 10% and less than or equal to 100% of an area of the upper surface-side projection portion forming region containing the plurality of upper surface-side projection portions when viewed from a direction orthogonal to the upper surface-side projection portion forming region, and
an elastic modulus of a material constituting the plurality of upper surface-side projection portions is greater than or equal to 0.1 MPa and less than or equal to 100 MPa.

2. The footwear according to claim 1, wherein
a minimum outer dimension in the cross-section orthogonal to the projecting direction of each of the plurality of upper surface-side projection portions is greater than or equal to 0.5 mm.

3. The footwear according to claim 1, wherein
the footbed portion includes at least a defining member defining the upper surface-side projection portion forming region including the plurality of upper surface-side projection portions, and
the defining member is a single molded object molded by a three-dimensional additive manufacturing method.

4. The footwear according to claim 1, wherein
the footwear includes a forefoot portion configured to support a toe portion and a ball portion of the wearer's foot, a midfoot portion configured to support an arch portion of the wearer's foot, and a rearfoot portion configured to support a heel portion of the wearer's foot, and
the upper surface-side projection portion forming region is disposed in the rearfoot portion.

5. The footwear according to claim 1, wherein
the footwear includes a forefoot portion configured to support a toe portion and a ball portion of the wearer's foot, a midfoot portion configured to support an arch portion of the wearer's foot, and a rearfoot portion configured to support a heel portion of the wearer's foot, and the upper surface-side projection portion forming region is disposed in a region straddling a boundary between the forefoot portion and the midfoot portion, the forefoot portion and the midfoot portion being a region supporting the foot sole of a portion corresponding to an MP joint of the wearer's foot.

6. The footwear according to claim 1, wherein the footwear includes a forefoot portion configured to support a toe portion and a ball portion of the wearer's foot, a midfoot portion configured to support an arch portion of the wearer's foot, and a rearfoot portion configured to support a heel portion of the wearer's foot, and the upper surface-side projection portion forming region is disposed across the forefoot portion, the midfoot portion, and the rearfoot portion.

7. The footwear according to claim 1, wherein an angle formed by the upper surface and each of the plurality of upper surface-side projection portions is 90°.

8. The footwear according to claim 1, wherein each of the plurality of upper surface-side projection portions is inclined from a rear end side toward a front end side of the footwear from a root side toward a tip end side, and each of the plurality of upper surface-side projection portions forming an angle with the upper surface is greater than or equal to 20° and less than 90°.

9. The footwear according to claim 1, wherein each of the plurality of upper surface-side projection portions has a tapered shape that thins from a root side toward a tip end side.

10. The footwear according to claim 1, wherein the footbed portion has a supported region supported by the shell in the attached state on a lower surface thereof, and the supported region at least partially includes a lower surface-side projection portion forming region in which a plurality of lower surface-side projection portions are arranged side by side, a maximum outer dimension in a cross-section orthogonal to a projecting direction of each of the plurality of lower surface-side projection portions is greater than or equal to 3.0 mm, a projection length of each of the plurality of lower surface-side projection portions is less than or equal to 2.0 mm, an arrangement density of the plurality of lower surface-side projection portions in the lower surface-side projection portion forming region is greater than or equal to 50% and less than or equal to 100% of an area ratio, and the elastic modulus of the material forming the plurality of lower surface-side projection portions is greater than or equal to 0.1 MPa and less than or equal to 100 MPa.

11. The footwear according to claim 10, wherein the footbed portion includes at least a defining member defining the upper surface-side projection portion forming region including the plurality of upper surface-side projection portions and the lower surface-side projection portion forming region including the plurality of lower surface-side projection portions, and the defining member is a single molded object molded by a three-dimensional additive manufacturing method.

12. The footwear according to claim 10, wherein the footwear includes a forefoot portion configured to support a toe portion and a ball portion of the wearer's foot, a midfoot portion configured to support an arch portion of the wearer's foot, and a rearfoot portion configured to support a heel portion of the wearer's foot, and the lower surface-side projection portion forming region is disposed at least on a peripheral edge of the rearfoot portion.

13. The footwear according to claim 10, wherein the footwear includes a forefoot portion configured to support a toe portion and a ball portion of the wearer's foot, a midfoot portion configured to support an arch portion of the wearer's foot, and a rearfoot portion configured to support a heel portion of the wearer's foot, and the lower surface-side projection portion forming region is disposed across the forefoot portion, the midfoot portion, and the rearfoot portion.

14. The footwear according to claim 10, wherein the lower surface-side projection portion forming region is arranged to circle around along a peripheral edge of the footbed portion.

15. The footwear according to claim 10, wherein each of the plurality of lower surface-side projection portions has a substantially columnar shape.

* * * * *